US007690981B2

(12) United States Patent
Ching et al.

(10) Patent No.: US 7,690,981 B2
(45) Date of Patent: Apr. 6, 2010

(54) GAMING DEVICE HAVING A PLAYER SELECTION GAME

(75) Inventors: Erick T. Ching, Reno, NV (US); Zeke Brill, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 1468 days.

(21) Appl. No.: 10/954,132

(22) Filed: Sep. 29, 2004

(65) Prior Publication Data

US 2005/0059461 A1 Mar. 17, 2005

Related U.S. Application Data

(63) Continuation-in-part of application No. 10/652,457, filed on Aug. 28, 2003, which is a continuation of application No. 09/822,697, filed on Mar. 30, 2001, now Pat. No. 6,796,899.

(51) Int. Cl.
*A63F 9/24* (2006.01)
*A63F 13/00* (2006.01)

(52) U.S. Cl. ............................ 463/20; 463/16; 463/21; 463/25; 463/42

(58) Field of Classification Search ............. 463/16–20, 463/25, 21, 42
See application file for complete search history.

(56) References Cited

U.S. PATENT DOCUMENTS 3,191,937 A * 6/1965 Kropinski ................... 273/265
3,386,739 A * 6/1968 Lino .......................... 273/269
3,506,267 A * 4/1970 Taillie ........................ 273/275
4,448,419 A 5/1984 Telnaes
4,560,161 A 12/1985 Hamano
4,618,150 A 10/1986 Kimura (Continued)

FOREIGN PATENT DOCUMENTS

EP 0874337 A1 10/1998

(Continued)

OTHER PUBLICATIONS

Addams Family Advertisement and Article written by IGT, published in 2000.

(Continued)

*Primary Examiner*—John M Hotaling, II
*Assistant Examiner*—Ryan Hsu
(74) *Attorney, Agent, or Firm*—K&L Gates LLP

(57) ABSTRACT

A gaming device that includes a plurality of elements or symbols which are each in one or more of a plurality of element groups or sets. The gaming device also includes a plurality of player selectable selections. Each player selectable selection is associated with one of the plurality of element groups or sets. In one embodiment, the player is enabled to pick one of the selections and each element in the element group or set associated with the picked selection is flagged or marked. If a designated element or combination of elements are not flagged, the player is enabled to pick at another one of the selections, one at a time, until a designated element or combination of elements are flagged or marked. Once a designated element or combination of elements are flagged or marked, the player is provided an award based, at least in part, on the specific element or combination of elements which are flagged or marked.

42 Claims, 28 Drawing Sheets

U.S. PATENT DOCUMENTS

| | | | | |
|---|---|---|---|---|
| 4,695,053 | A | 9/1987 | Vazquez, Jr. et al. | |
| 4,775,155 | A | 10/1988 | Lees | |
| 5,205,555 | A | 4/1993 | Hamano | |
| 5,342,047 | A | 8/1994 | Heidel et al. | |
| 5,344,145 | A | 9/1994 | Chadwick et al. | |
| 5,393,057 | A | 2/1995 | Marnell, II | |
| 5,393,061 | A | 2/1995 | Manship et al. | |
| 5,411,271 | A | 5/1995 | Mirando | |
| 5,449,173 | A | 9/1995 | Thomas et al. | |
| 5,456,465 | A | 10/1995 | Durham | |
| 5,536,016 | A | 7/1996 | Thompson | |
| 5,577,727 | A * | 11/1996 | Brame et al. | 273/139 |
| 5,611,535 | A | 3/1997 | Tiberio | |
| 5,611,730 | A | 3/1997 | Weiss | |
| 5,639,089 | A | 6/1997 | Matsumoto et al. | |
| 5,641,730 | A | 6/1997 | Brown | |
| 5,645,486 | A | 7/1997 | Nagao et al. | |
| 5,722,891 | A | 3/1998 | Inoue | |
| 5,752,881 | A | 5/1998 | Inoue | |
| 5,755,619 | A | 5/1998 | Matsumoto et al. | |
| 5,769,716 | A | 6/1998 | Saffari et al. | |
| 5,772,509 | A | 6/1998 | Weiss | |
| 5,788,573 | A | 8/1998 | Baerlocher et al. | |
| 5,823,874 | A | 10/1998 | Adams | |
| 5,833,537 | A | 11/1998 | Barrie | |
| 5,848,932 | A | 12/1998 | Adams | |
| 5,851,148 | A | 12/1998 | Brune et al. | |
| 5,882,261 | A | 3/1999 | Adams | |
| 5,890,962 | A | 4/1999 | Takemoto | |
| 5,902,184 | A | 5/1999 | Bennett | |
| 5,911,418 | A | 6/1999 | Adams | |
| 5,927,714 | A | 7/1999 | Kaplan | |
| 5,934,998 | A | 8/1999 | Forte et al. | |
| 5,935,002 | A | 8/1999 | Falciglia | |
| 5,938,200 | A | 8/1999 | Markowicz et al. | |
| 5,947,820 | A | 9/1999 | Morro et al. | |
| 5,951,397 | A | 9/1999 | Dickinson | |
| 5,976,015 | A | 11/1999 | Seelig et al. | |
| 5,980,384 | A | 11/1999 | Barrie | |
| 5,997,400 | A | 12/1999 | Seelig et al. | |
| 5,997,401 | A | 12/1999 | Crawford | |
| 6,004,207 | A | 12/1999 | Wilson, Jr. et al. | |
| 6,015,346 | A | 1/2000 | Bennett | |
| 6,019,369 | A | 2/2000 | Nakagawa et al. | |
| 6,033,307 | A | 3/2000 | Vancura | |
| 6,056,642 | A | 5/2000 | Bennett | |
| 6,059,289 | A | 5/2000 | Vancura | |
| 6,059,658 | A | 5/2000 | Mngano et al. | |
| 6,062,980 | A | 5/2000 | Luciano | |
| 6,089,976 | A | 7/2000 | Schneider et al. | |
| 6,089,978 | A | 7/2000 | Adams | |
| 6,093,102 | A | 7/2000 | Bennett | |
| 6,095,921 | A | 8/2000 | Walker et al. | |
| 6,102,798 | A | 8/2000 | Bennett | |
| 6,117,009 | A | 9/2000 | Yoseloff | |
| 6,120,377 | A * | 9/2000 | McGinnis et al. | 463/20 |
| 6,126,542 | A | 10/2000 | Fier | |
| 6,135,884 | A | 10/2000 | Hedrick et al. | |
| 6,142,873 | A | 11/2000 | Weiss et al. | |
| 6,159,097 | A | 12/2000 | Gura | |
| 6,159,098 | A | 12/2000 | Slomiany et al. | |
| 6,162,121 | A | 12/2000 | Morro et al. | |
| 6,165,071 | A | 12/2000 | Weiss | |
| 6,168,520 | B1 | 1/2001 | Baerlocher et al. | |
| 6,168,523 | B1 | 1/2001 | Piechowiak et al. | |
| 6,173,955 | B1 | 1/2001 | Perrie et al. | |
| 6,174,235 | B1 | 1/2001 | Walker et al. | |
| 6,186,894 | B1 | 2/2001 | Mayeroff | |
| 6,190,254 | B1 | 2/2001 | Bennett | |
| 6,190,255 | B1 | 2/2001 | Thomas et al. | |
| 6,203,429 | B1 | 3/2001 | Demar et al. | |
| 6,224,482 | B1 | 5/2001 | Bennett | |
| 6,224,483 | B1 | 5/2001 | Mayeroff | |
| 6,227,971 | B1 | 5/2001 | Weiss | |
| 6,231,442 | B1 | 5/2001 | Mayeroff | |
| 6,234,897 | B1 | 5/2001 | Frohm et al. | |
| 6,261,177 | B1 | 7/2001 | Bennett | |
| 6,270,408 | B1 | 8/2001 | Sakamoto et al. | |
| 6,270,411 | B1 | 8/2001 | Gura et al. | |
| 6,270,412 | B1 | 8/2001 | Crawford et al. | |
| 6,299,165 | B1 | 10/2001 | Nagano | |
| 6,309,300 | B1 | 10/2001 | Glavich | |
| 6,315,660 | B1 | 11/2001 | DeMar et al. | |
| 6,315,663 | B1 | 11/2001 | Sakamoto | |
| 6,315,664 | B1 | 11/2001 | Baerlocher et al. | |
| 6,319,123 | B1 | 11/2001 | Paludi | |
| 6,319,124 | B1 | 11/2001 | Baerlocher et al. | |
| 6,322,309 | B1 | 11/2001 | Thomas et al. | |
| 6,334,814 | B1 | 1/2002 | Adams | |
| 6,336,863 | B1 | 1/2002 | Baerlocher et al. | |
| 6,346,043 | B1 | 2/2002 | Colin et al. | |
| 6,364,766 | B1 | 4/2002 | Anderson et al. | |
| 6,364,767 | B1 | 4/2002 | Brossard et al. | |
| 6,364,768 | B1 | 4/2002 | Acres et al. | |
| 6,398,644 | B1 * | 6/2002 | Perrie et al. | 463/18 |
| 6,428,412 | B1 * | 8/2002 | Anderson et al. | 463/9 |
| 6,435,511 | B1 | 8/2002 | Vancura et al. | |
| 6,439,995 | B1 * | 8/2002 | Hughs-Baird et al. | 463/20 |
| 6,443,837 | B1 | 9/2002 | Jaffe et al. | |
| 6,450,887 | B1 * | 9/2002 | Mir et al. | 463/42 |
| 6,461,241 | B1 | 10/2002 | Webb et al. | |
| 6,464,582 | B1 | 10/2002 | Baerlocher et al. | |
| 6,508,707 | B2 | 1/2003 | DeMar et al. | |
| 6,511,375 | B1 * | 1/2003 | Kaminkow | 463/20 |
| 6,347,996 | B1 | 2/2003 | Locke | |
| 6,514,141 | B1 * | 2/2003 | Kaminkow et al. | 463/25 |
| 6,547,242 | B1 | 4/2003 | Sugiyama et al. | |
| 6,554,283 | B2 | 4/2003 | Vancura et al. | |
| 6,561,904 | B2 | 5/2003 | Locke et al. | |
| 6,585,591 | B1 * | 7/2003 | Baerlocher et al. | 463/25 |
| 6,599,185 | B1 | 7/2003 | Kaminkow et al. | |
| 6,599,193 | B2 | 7/2003 | Baerlocher et al. | |
| 6,602,135 | B1 | 8/2003 | Gerrard | |
| 6,602,137 | B2 | 8/2003 | Kaminkow et al. | |
| 6,607,437 | B2 | 8/2003 | Casey et al. | |
| 6,607,438 | B2 | 8/2003 | Baerlocher et al. | |
| 6,609,971 | B2 | 8/2003 | Vancura | |
| 6,609,972 | B2 * | 8/2003 | Seelig et al. | 463/16 |
| 6,609,973 | B1 * | 8/2003 | Weiss | 463/20 |
| 6,632,140 | B2 | 10/2003 | Berman et al. | |
| 6,645,071 | B2 * | 11/2003 | Perrie et al. | 463/16 |
| 6,685,561 | B2 | 2/2004 | Anderson et al. | |
| 6,719,630 | B1 | 4/2004 | Seelig et al. | |
| 6,796,899 | B2 | 9/2004 | Baerlocher | |
| 6,796,900 | B2 | 9/2004 | Baerlocher et al. | |
| 6,802,775 | B2 * | 10/2004 | Baerlocher et al. | 463/16 |
| 6,855,052 | B2 | 2/2005 | Weiss et al. | |
| 6,899,618 | B2 | 5/2005 | Colin et al. | |
| 6,913,533 | B2 * | 7/2005 | Cuddy et al. | 463/16 |
| 6,932,701 | B2 * | 8/2005 | Glavich et al. | 463/20 |
| 7,169,046 | B2 | 1/2007 | Webb et al. | |
| 7,270,604 | B2 | 9/2007 | Gerrard et al. | |
| 7,575,514 | B2 * | 8/2009 | Cuddy et al. | 463/16 |
| 2001/0024971 | A1 * | 9/2001 | Brossard | 463/30 |
| 2001/0031659 | A1 * | 10/2001 | Perrie et al. | 463/18 |
| 2002/0052232 | A1 * | 5/2002 | Kaminkow | 463/20 |
| 2002/0142821 | A1 * | 10/2002 | Baerlocher | 463/16 |
| 2003/0078089 | A1 | 4/2003 | Gray et al. | |
| 2004/0002372 | A1 | 1/2004 | Rodgers et al. | |
| 2004/0204229 | A1 * | 10/2004 | Walker et al. | 463/20 |

FOREIGN PATENT DOCUMENTS

| | | | |
|---|---|---|---|
| EP | 0945837 | A2 | 9/1999 |

| | | | |
|---|---|---|---|
| EP | 0984408 | A2 | 3/2000 |
| EP | 0984409 | A2 | 3/2000 |
| GB | 2353128 | | 2/2001 |
| WO | WO 00/12186 | | 3/2000 |
| WO | WO 02/078804 | A1 | 10/2002 |

OTHER PUBLICATIONS

Austin Powers Brochure written by IGT, published in 2001.
Jackpot Party Brochures and Articles written by WMS Gaming, Inc., published in 1998.
Jumble Article written by Strictly Slots, published in Dec. 2000.
Jumble Description on WMS Gaming, Inc. website (www.wmsgaming.com), Printed Mar. 21, 2001.
Polly & Roger Brochure written by Anchor Games, published in 2000.
Price is Right Showcase Showdown Description on www.schuminweb.com (website), printed Mar. 16, 2001.
Sphinx Advertisement written by Atronic Casino Technology, Ltd., published in 2000.
A Salute to Game Shows, [Online] Retrieved from the Internet: <URL http://game-shows.chris-place.com/shows/price-is-right/pricing-games.htm. [Downloaded Oct. 25, 2007] (10 pages).
Bonus Spin Advertisement, written by IGT, published prior to 2000.
Double Diamond Run Advertisement, written by IGT, published in 2001.
Fortune Cookie Advertisement, written by IGT, published in 2000.
Little Devil Advertisement, written by IGT, published in 2000.
On the Money Article, written by Strictly Slots, published in 2000.
Price is Right Advertisement, written by IGT, published in 2001.
Party Time Psycho Cash Beast Advertisement, written by IGT, published in 1999.
Texas Tea Advertisement, written by IGT, published in 2000.
Wheel of Fortune Advertisement, written by IGT, published in 1997.
Winning Streak Advertisement, written by Aristocrat, published in 1994.
Vision Bonus Games $2^{nd}$ Edition, written by IGT, published in 1999.

* cited by examiner

FIG.13

| AWARD | PROBABILITY |
|---|---|
| 5 | 5 % |
| 10 | 10 % |
| 15 | 20 % |
| 20 | 20 % |
| 25 | 20 % |
| 30 | 10 % |
| 35 | 10 % |
| 40 | 5 % |
| TOTAL | 100 % |

FIG.14

| SET | PROBABILITY |
|---|---|
| A | 40.00% |
| B | 40.00% |
| A&B | 20.00% |
| | 100.00% |

GAMING DEVICE HAVING A PLAYER SELECTION GAME

This application is a continuation-in-part of and claims the benefit of U.S. patent application Ser. No. 10/652,457, filed Aug. 28, 2003, which is a continuation of and claims the benefit of U.S. patent application Ser. No. 09/822,697, filed Mar. 30, 2001, now U.S. Pat. No. 6,796,899, which are incorporated in their entirety herein.

CROSS-REFERENCE TO RELATED APPLICATIONS

This application is related to the following commonly-owned co-pending patent applications: "GAMING DEVICE HAVING A BONUS SCHEME WITH MULTIPLE SELECTION GROUPS," Ser. No. 09/656,702, now U.S. Pat. No. 6,439,995; "GAMING DEVICE WITH BONUS SCHEME PROVIDING INCREASED REWARD FOR SELECTING RELATED SYMBOLS," Ser. No. 09/605,023, now U.S. Pat. No. 6,669,559; "GAMING DEVICE HAVING A MULTIPLE SELECTION GROUP BONUS ROUND," Ser. No. 09/605,107, now U.S. Pat. No. 6,511,375; "GAMING DEVICE HAVING A MULTIPLE SELECTION SET BONUS SCHEME," Ser. No. 09/680,592, now U.S. Pat. No. 6,602,135; "GAMING DEVICE HAVING A BONUS SCHEME INCLUDING A PLURALITY OF SELECTION GROUPS WITH WIN-GROUP OUTCOMES," Ser. No. 09/981,084, now U.S. Pat. No. 6,932,701; "APPARATUS AND METHOD FOR MODIFYING GENERATED VALUES TO DETERMINE AN AWARD IN A GAMING DEVICE," Ser. No. 09/957,018, "GAMING DEVICE HAVING A BONUS SCHEME WITH MULTIPLE POTENTIAL AWARD SETS," Ser. No. 09/822,697, now U.S. Pat. No. 6,796,899; "GAMING DEVICE HAVING A BONUS SCHEME WITH MULTIPLE SELECTION GROUPS," Ser. No. 10/195,292, now U.S. Pat. No. 6,595,854; "GAMING DEVICE HAVING A BONUS SCHEME WITH MULTIPLE SELECTION GROUPS," Ser. No. 10/243,047, now U.S. Pat. No. 7,273,415; "GAMING DEVICE HAVING A MULTIPLE SELECTION GROUP BONUS ROUND," Ser. No. 10/327,538, now U.S. Pat. No. 7,303,469; "GAMING DEVICE HAVING A BONUS SCHEME WITH MULTIPLE POTENTIAL AWARDS SETS," Ser. No. 10/652,457, "GAMING DEVICE HAVING A BONUS SCHEME WITH MULTIPLE SELECTION GROUPS," Ser. No. 10/623,421, now U.S. Pat. No. 7,182,689; "GAMING DEVICE HAVING A MULTIPLE SELECTION SET BONUS SCHEME," Ser. No. 10/607,663, now U.S. Pat. No. 6,863,607; "GAMING DEVICE HAVING A CHANGING MULTIPLE SELECTION SET BONUS SCHEME," Ser. No. 10/458,445, now U.S. Patent No. 6,817,943; "GAMING DEVICE WITH BONUS SCHEME PROVIDING INCREASED REWARD FOR SELECTING RELATED SYMBOLS," Ser. No. 10/690,305,now U.S. Pat. No. 6,878,061; "GAMING DEVICE HAVING A BONUS SCHEME WITH MULTIPLE POTENTIAL AWARD SETS," Ser. No. 10/949,088, "GAMING DEVICE HAVING A CHANGING MULTIPLE SELECTION SET BONUS SCHEME," Ser. No. 10/977,672, and "GAMING DEVICE HAVING A PLURALITY OF SYMBOL GENERATORS AND ACCUMULATION GAME WITH MULTIPLE INDEPENDENT TERMINATING CONDITIONS," Ser. No. 10/941,485.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Primary and secondary games in gaming machines generally result in a win or a loss for the player. In a slot machine game, the game ends when the reels stop and the gaming device analyzes the symbol combinations to determine if one or more winning outcomes exist. In a poker game, the game randomly deals cards, the player has one or more opportunities to randomly generate one or more new cards and the player wins or loses based on a final combination of cards. In a blackjack game, the player's card values add until the player's hand beats the dealer's hand, loses to the dealer's hand or busts.

In each of these well known games, the game ends after a number of random generations. In slot machines, the basic game ends after one random generation. In poker machines, the game ends after one, two or more random generations, depending on the type of poker game. In blackjack machines, the number of generations varies, but has a limit, namely, the number until the card denominations add to or exceed twenty one.

Known bonus games employ a plurality of game ending strategies. One known strategy is a do-until strategy in which the player picks until picking a bonus terminator. European Patent Application No. EP 0 945 837 A2 filed on Mar. 18, 1999 and assigned on its face to WMS Gaming, Inc. discloses a bonus game in which a player has one or more opportunities to select masked bonus awards. When the player selects a masked award, the game reveals the selection and provides the award to the player. The player selects until all the selections are selected or until selecting a game terminator. In other games, the player selects from a group of selections until two or more matching selections are picked by the player.

Another known bonus game ending strategy includes letting the player decide whether to end the game with a particular result or trade results with the hope of obtaining a higher award. The TOP DOLLAR® gaming device, which is manufactured and distributed by the assignee of this application, provides the player with three offers and a final award. When an offer is given, the player may accept or reject it. If the player accepts an offer, the player receives the accepted bonus amount and the bonus round terminates. If the player declines an offer, the game generates another offer for the player, which may be a higher or lower award. The game is similar to poker, wherein the player has a limited opportunity to better an outcome.

Bingo games are also known. In a conventional bingo game, players are provided with bingo cards that have a plurality of elements arranged as a matrix of five rows and five columns. The elements are identified as the numbers 1 through 75 which are divided into five sets, with each set having fifteen numbers. Each set is associated with a vertical column in the matrix and each column from left to right is assigned one letter from the word "BINGO." The center space in the matrix is conventionally a "free space." Bingo balls are individually numbered from 1 through 75 and are mixed together. Balls are then randomly selected one at a time. As each selected number is announced, each player covers any corresponding number on his or her bingo card. Play continues until one of the players covers a predefined winning arrangement or pattern of spots on the bingo card. A winning arrangement may be any designated pattern, such as any of the five vertical columns, any of the five horizontal rows or either of the two diagonals on the bingo card. Other winning combinations include the four corners of the bingo card, the eight spots immediately surrounding the free space, a circle around the free space, a diamond pattern or a pattern which forms a letter, such as an H pattern, a C pattern or a T pattern. An award or prize is provided to the first player to achieve the predefined winning pattern and the Bingo game ends.

In each of the foregoing games, the game ends upon a limited number of random generations or upon a result of the random generations. In an effort to create a more entertaining and exciting game, a need exists to create a gaming machine or device having new apparatus and method for ending a game and combine these with the known methods described above.

SUMMARY OF THE INVENTION

The present invention provides a gaming device and in particular a bonus scheme of a gaming device that enables players to accumulate awards in a plurality of sets until one of the sets is completed. Each set includes at least one and preferably a plurality of components. The gaming device enables a player to pick a plurality of selections from a group of masked selections. Preferably, a component from one of the sets is associated with each selection. A component from two or more of, or each of the sets, could also be associated with a selection.

In the preferred embodiment, the components of a set include values, modifiers and bonuses; however, it should be appreciated that other components could be part of or associated with a set or a plurality of sets in addition to or in place of the values, modifiers and bonuses. At least one and preferably a plurality of designated or predetermined components are necessary to complete a set. For instance, in the preferred embodiment, each set has a plurality of value components. To complete such set, all of the value components in such set must be obtained or selected by the player. It should be appreciated that the number of or type of components in each set necessary to complete the set may vary and that the components necessary to terminate each set is preferably, but does not have to be, identical or similar. For example, a bonus component may be required to complete one of the sets.

Each component preferably has a symbol or other identifier associated with the component, and particularly the value components or the components necessary to complete a set. Thus, when the player picks one of the selections from the group of masked selections (which the game preferably simultaneously displays to the player), the game reveals the value and the identifier or symbol associated with one of the sets (i.e., to identify the component of the appropriate set). In one embodiment of the invention, an identifier or symbol is associated with a selection before a player picks from the group of masked selections. In another embodiment, the player picks the selection and then the symbol or identifier is associated with the selection before revealing the selection to the player. It should also be appreciated that the processor of the gaming device could randomly determine the selections. In accord with one aspect of the invention, the components are weighted such that the processor is more likely to assign one component to a selection over another component.

The player preferably receives the award associated with the first set completed; however, the player could receive an award from another completed set, such as the last set completed or from an uncompleted set. The award provided to the player is preferably based on the components of the appropriate set, such as the first set completed in the preferred embodiment. In the preferred embodiment, the award provided to the player includes the sum of the value components achieved, modified by any modifiers such as a multiplier (if any modifiers are obtained before the first set is completed) and the addition of any bonuses (if any bonuses are obtained before the first set is completed).

As indicated above, another aspect of the invention includes bonuses or bonus credits which are associated with the selections. If a player picks a selection and generates a bonus, the bonus is added to the designated set, a combination of the sets, or to all of the sets.

As also indicated above, in yet another aspect of the invention a modifier, such as a multiplier, is associated with one or more of the selections. If a player picks a selection, which includes a modifier, the modifier changes the value of a set based on the modifier. A modifier may be associated with any designated set, a combination of the sets, or all of the sets.

Although the present invention is discussed relative to a bonus game of a gaming machine, it should be appreciated that the present invention could be employed as a primary game in a gaming device.

It is therefore an advantage of the present invention to provide a gaming device having a plurality of potential award sets and a player obtains an award associated with one of the award sets.

In another embodiment, the gaming device of the present invention includes a plurality of elements or symbols which are displayed to a player. Each of the elements or symbols is in at least one of a plurality of element groups or sets and at least one and preferably a plurality of the elements are in more than one of the element groups or sets. The gaming device does not initially display which elements are in which element groups or sets. The gaming device also includes a plurality of player selectable selections. Each player selectable selection is associated with one of the plurality of element groups or sets. In one embodiment, the player is enabled to pick one of the selections and each element in the element group or set associated with the picked selection is flagged or marked. In this embodiment, if a designated pattern or combination of two or more elements are not flagged, the player is enabled to pick, one at a time, at least another one of the selections until a designated pattern or combination of elements are flagged or marked. Once a designated pattern or combination of elements are flagged or marked, the player is provided an award based, at least in part, on that specific combination of flagged elements.

In one embodiment, the plurality of elements or symbols are arranged in a matrix or grid configuration, wherein each different position of the matrix is a different element. In this embodiment, each different designated combination of elements is associated with an award, such as a value or a modifier. For example, if each different row and column of a grid is a different designated combination of elements, then each different row or column is associated with an award.

In this embodiment, upon initiation of the game, the player is enabled to select one of the plurality of selections. Once selected, each of the elements in the element group associated with the player picked selection are marked or flagged. For example, if three positions of the grid are each in the element group which is associated with the player picked selection, those three grid positions are marked or flagged.

In one embodiment, each of the element groups includes at least one element and at least one of the element groups includes a plurality of elements. In another embodiment, a plurality of the element groups each include a plurality of the elements. In another embodiment, each of the element groups includes a plurality of the elements. In one embodiment, at least one the selections is associated with a plurality of the different element groups. In another embodiment, a plurality of the selections are each associated with a plurality of the different element groups.

After marking the elements in the element group associated with the player picked selection, the gaming device determines if at least one designated pattern or combination of elements (i.e., a designated winning pattern of elements) is marked or flagged. In different embodiments, the designated element, combination or pattern of elements which must be selected is predetermined, randomly determined, determined based on the player's wager in a primary game, determined from the occurrence of one or more symbols in a primary game or determined based on any other suitable method. For example, a designated combination of elements may be a specific number of selected adjacent elements or grid positions.

If each of the elements in at least one designated combination of elements are flagged or marked, the gaming device provides the player any award associated with that designated combination of marked elements and ends the game. For example, if each different row and column of the grid is a different designated combination of elements, then upon the flagging or marking of each of the elements in a row or column, the gaming device provides the player any award associated with the flagged row or flagged column and ends the game.

If each of the elements in at least one designated combination of elements are not marked or flagged, the gaming device enables the player to pick another one of the plurality of selections. Each of the elements in the element group associated with the player picked selection are marked or flagged and the gaming device again determines if a designated combination of elements are marked or flagged. This process continues as described above until each of the elements in a designated combination of elements are flagged or marked, any award associated with that designated combination of marked elements is provided to the player and the game ends.

In another embodiment of the present invention, rather than associating an award with each different designated combination of elements, an award is associated with one, more or each of the elements. In this embodiment, as each element is flagged (i.e., a selection associated with an element group which includes that element is picked), any award associated with the flagged element is displayed to the player. For example, if two elements (i.e., grid positions) are each in the element group associated with a player picked selection, the elements or grid positions are marked or flagged and the gaming device displays to the player any award associated with each of the flagged elements or grid positions. This embodiment proceeds as described above until a designated combination of elements are flagged or marked. When each of the elements in a designated combination of elements are flagged or marked, the displayed awards of each of the elements in the designated combination of flagged elements are provided to the player and the game ends. It should be appreciated that in one embodiment, if an element is flagged more than once, the award displayed with that element is increased each time that element is flagged. That is, if two selections are picked and each selection is associated with an element group that includes the same element, then each time that element is flagged, the displayed award associated with that element increases. For example, if an element is initially associated with an award value of five, the first time that element is flagged, the gaming device will display an award value of five associated with that element and the second time that element is flagged, the gaming device will display an award value of ten associated with that element. In another embodiment, once an element is flagged, the award displayed as associated with that flagged element will remain constant regardless of how many times that element is subsequently flagged.

The present invention may be provided as a primary game operable upon a wager or as a secondary game activated upon a triggering event in or associated with a primary game or another secondary game.

In one embodiment, the present invention provides a gaming device operable under control of a processor, the gaming device including a game controlled by the processor, a plurality of elements in the game and a plurality of different element groups in the game, wherein each of the element groups includes at least one of the elements and at least one of the element groups includes a plurality of the elements. The gaming device also includes a plurality of selections in the game, wherein each of the selections is associated with one of the different element groups and at least one of said selections is associated with a plurality of said different element groups. The gaming device also includes at least one designated pattern of elements, the designated pattern of elements including at least two of the elements and a display device adapted to display the game. The processor is operable with the display device to control a play of the game by (a) causing one of the selections to be picked, (b) flagging each of the elements in the element group associated with the picked selection and (c) determining if all of the elements in one of the designated patterns of elements has been flagged. The processor is also operable to control a play of the game by (d) repeating (a) to (c) if all of the elements in one of the designated patterns of elements has not been flagged and (e) if all of the elements in one of the designated patterns of elements has been flagged, providing a player an award, wherein the award is based, at least in part, on the designated pattern of flagged elements.

In another embodiment, the present invention provides a gaming device operable under control of a processor, the gaming device including a game controlled by the processor, a plurality of awards in the game, a plurality of elements in the game, wherein a plurality of the elements are associated with the plurality of awards and a plurality of different element groups in the game, wherein each of the element groups includes at least one of the elements and at least one of the element groups includes a plurality of the elements. The gaming device also includes a plurality of selections in the game, wherein each of the selections is associated with one of the different element groups and at least one of said selections is associated with a plurality of said different element groups. The gaming device also includes at least one designated pattern of elements, each designated pattern of elements including at least two of the elements and a display device adapted to display the game. The processor is operable with the display device to control a play of the game by (a) causing one of the selections to be picked, (b) flagging each of the elements in the element group associated with the picked selection and (c) displaying any of the awards associated with the flagged elements. The processor is also operable to control a play of the game by (d) determining if all of the elements in one of the designated patterns of elements has been flagged, (e) repeating (a) to (d) if all of the elements in one of the designated patterns of elements has not been flagged and (f) if all of the elements in one of the designated patterns of elements has been flagged, providing a player a total award, wherein the total award is based, at least in part, on any awards which are associated with the flagged elements in the designated pattern of flagged elements.

In another embodiment, the present invention provides a method of operating a gaming device, the method including (a) causing one of a plurality of selections to be picked, each of the selections associated with one of a plurality of different element groups and at least one of said selections associated with a plurality of said different element groups, wherein each of the element groups includes at least one of a plurality of elements and at least one of the element groups includes a plurality of the elements and (b) flagging each of the elements in the element group associated with the picked selection. The method also includes (c) determining if all of the elements in at least one of a plurality of designated patterns of elements has been flagged, (d) repeating steps (a) to (c) if all of the elements in at least one of the designated patterns of elements has not been flagged and (e) if all of the elements in at least one of the designated patterns of elements has been flagged, providing a player an award, wherein the award is based, at least in part, on the designated pattern of flagged elements.

In another embodiment, the present invention provides a method of operating a gaming device, the method including (a) causing one of a plurality of selections to be picked, each of the selections associated with one of a plurality of different element groups and at least one of said selections associated with a plurality of said different element groups, wherein each of the element groups includes at least one of a plurality elements, at least one of the element groups includes a plurality of the elements and a plurality of the elements are associated with a plurality of awards, (b) flagging each of the elements in the element group associated with the picked selection and (c) displaying any of the awards associated with the flagged elements. The method also includes (d) determining if all of the elements in at least one of a plurality of designated patterns of elements has been flagged, (e) repeating steps (a) to (d) if all of the elements in at least one of the designated patterns of elements has not been flagged and (f) if all of the elements in at least one of the designated patterns of elements has been flagged, providing a player a total award, wherein the total award is based, at least in part, on any awards which are associated with the flagged elements in the designated pattern of flagged elements.

One embodiment of the present invention provides a selection game wherein the player is provided one or more awards based on which selections the player picks. Providing a selection game that enables a player to obtain an award based, at least in part, on the selections a player picks provides increased excitement and entertainment for a player.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE FIGURES

FIG. 13 is a schematic diagram illustrating an award distribution table;

FIG. 14 is a schematic diagram illustrating a component distribution table;

DETAILED DESCRIPTION OF THE INVENTION

Gaming Device and Electronics

Figure 1A:
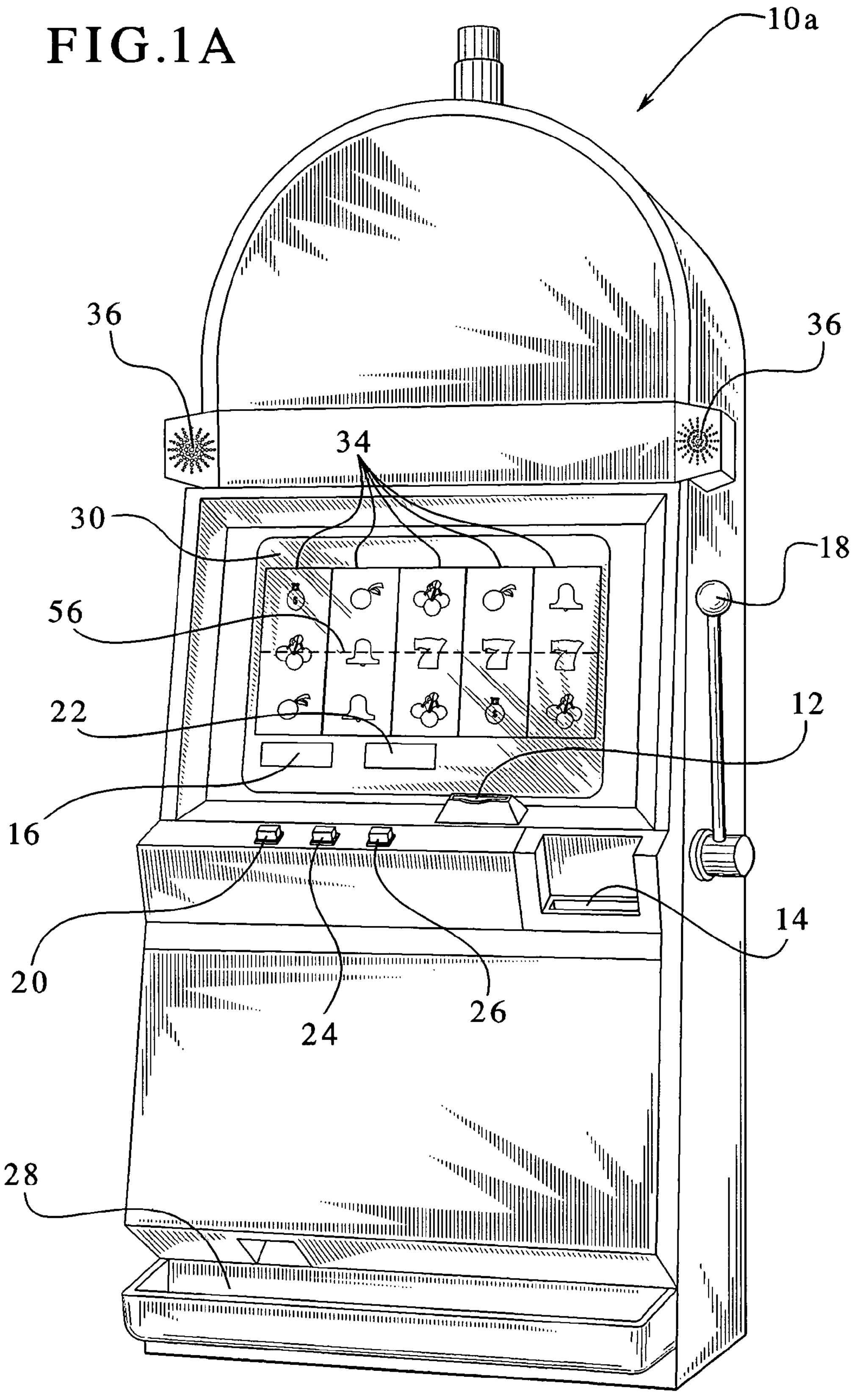
FIG. 1A is a front-side perspective view of one embodiment of the gaming device of the present invention.
Figure 1B:
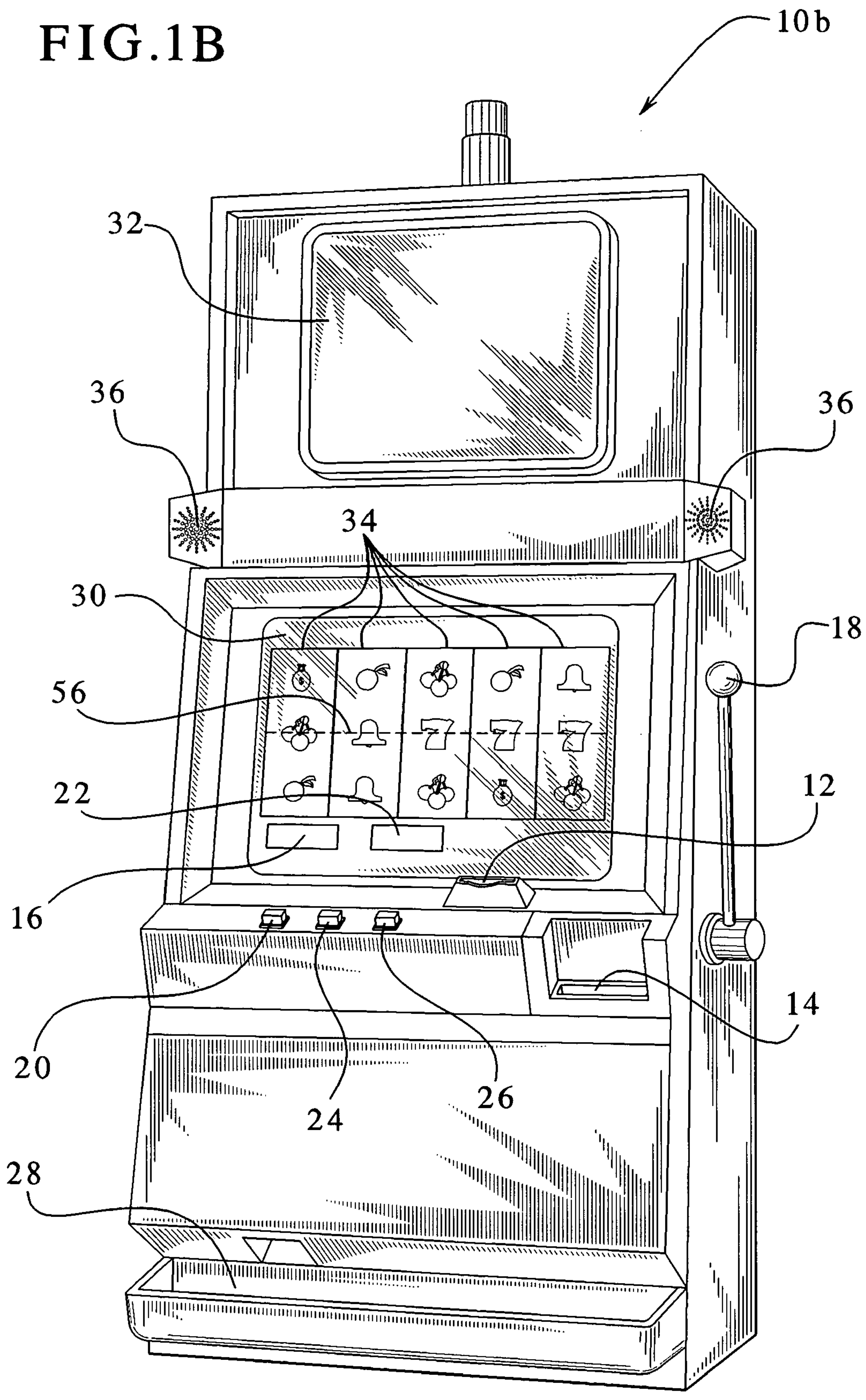
FIG. 1B is a front-side perspective view of another embodiment of the gaming device of the present invention.

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game of the present invention (described below) encompassing a stand alone game or a bonus or secondary game that coordinates with a base game. When the game of the present invention is a bonus game, gaming device 10 in one base game is a slot machine having the controls, displays and features of a conventional slot machine, wherein the player operates the gaming device while standing or sitting. Gaming device 10 also includes being a pub-style or table-top game (not shown), which a player operates while sitting.

The base games of the gaming device 10 include slot, poker, blackjack or keno, among others. The gaming device 10 also embodies any bonus triggering events, bonus games as well as any progressive game coordinating with these base games. The symbols and indicia used for any of the base, bonus and progressive games include mechanical, electrical or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. At any time during the game, a player may "cash out" by pushing a cash out button 26 to receive coins or tokens in the coin payout tray 28 or other forms of payment, such as an amount printed on a ticket or credited to a credit cards, debit cards or smart cards. Well known ticket printing and card reading machines (not illustrated) are commercially available.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, and preferably in the slot machine embodiment of the gaming device 10, includes speakers 36 for making sounds or playing music.

Figure 2:
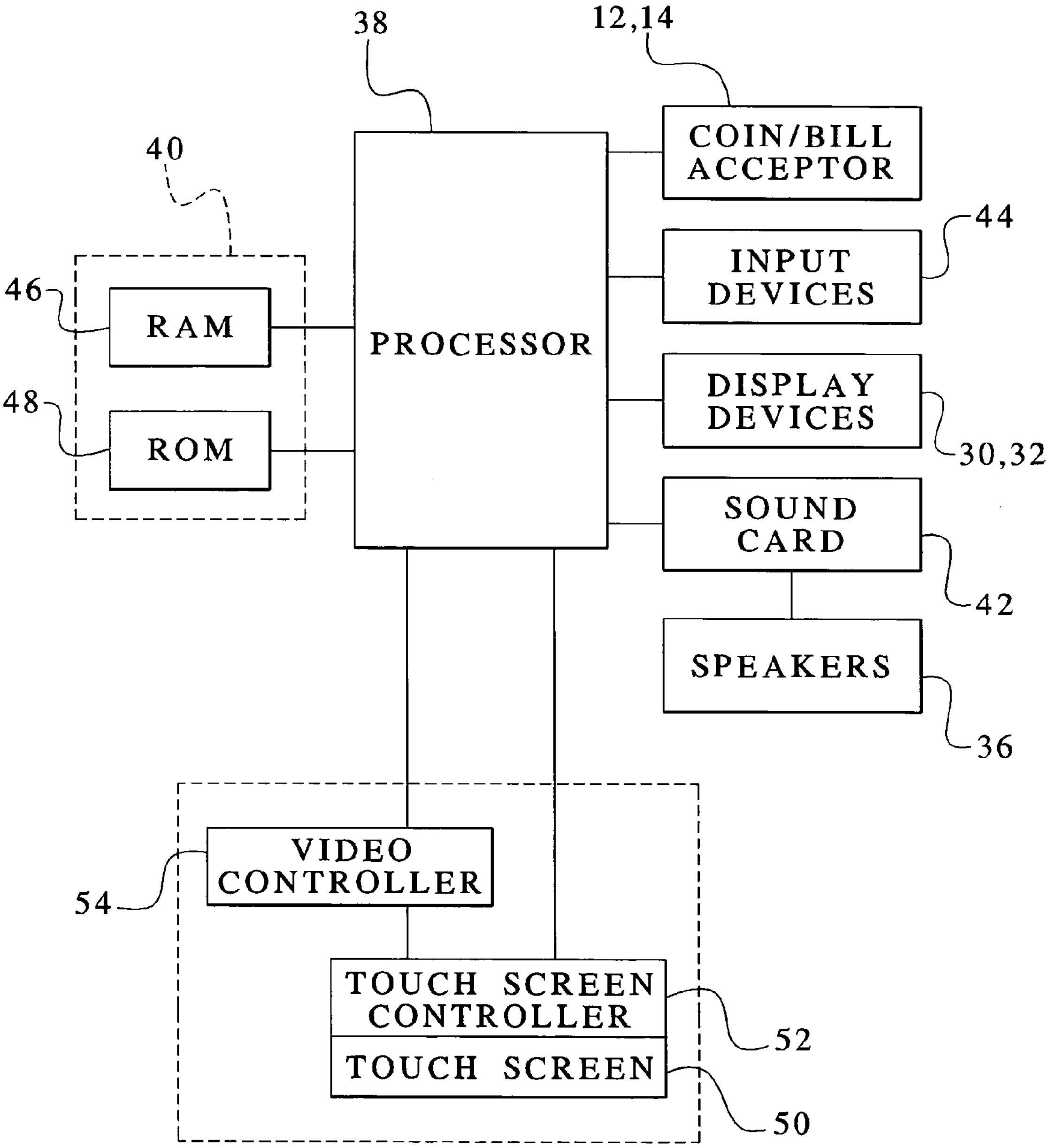
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or the "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. A player can make decisions and input signals into the gaming device 10 by touching touch screen 50 at the appropriate places. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming the device 10, the player inserts the appropriate amount of money or tokens at coin slot 12 or bill acceptor 14 and then pulls the arm 18 or pushes the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. Bonus games include a program that automatically begins when the player achieves a qualifying condition in the base game. The gaming device 10 preferably employs a video-based central display device 30 or 32 for the bonus round.

In the slot machine embodiment, the qualifying condition includes a particular symbol or symbol combination generated on a display device. As illustrated in the five reel slot game shown in FIGS. 1A and 1B, the qualifying condition includes the number seven appearing on three adjacent reels 34 along a payline 56. It should be appreciated that the present invention includes one or more paylines, such as payline 56, wherein the paylines can be horizontal, diagonal or any combination thereof.

Multiple Potential Award Sets

Figure 3:
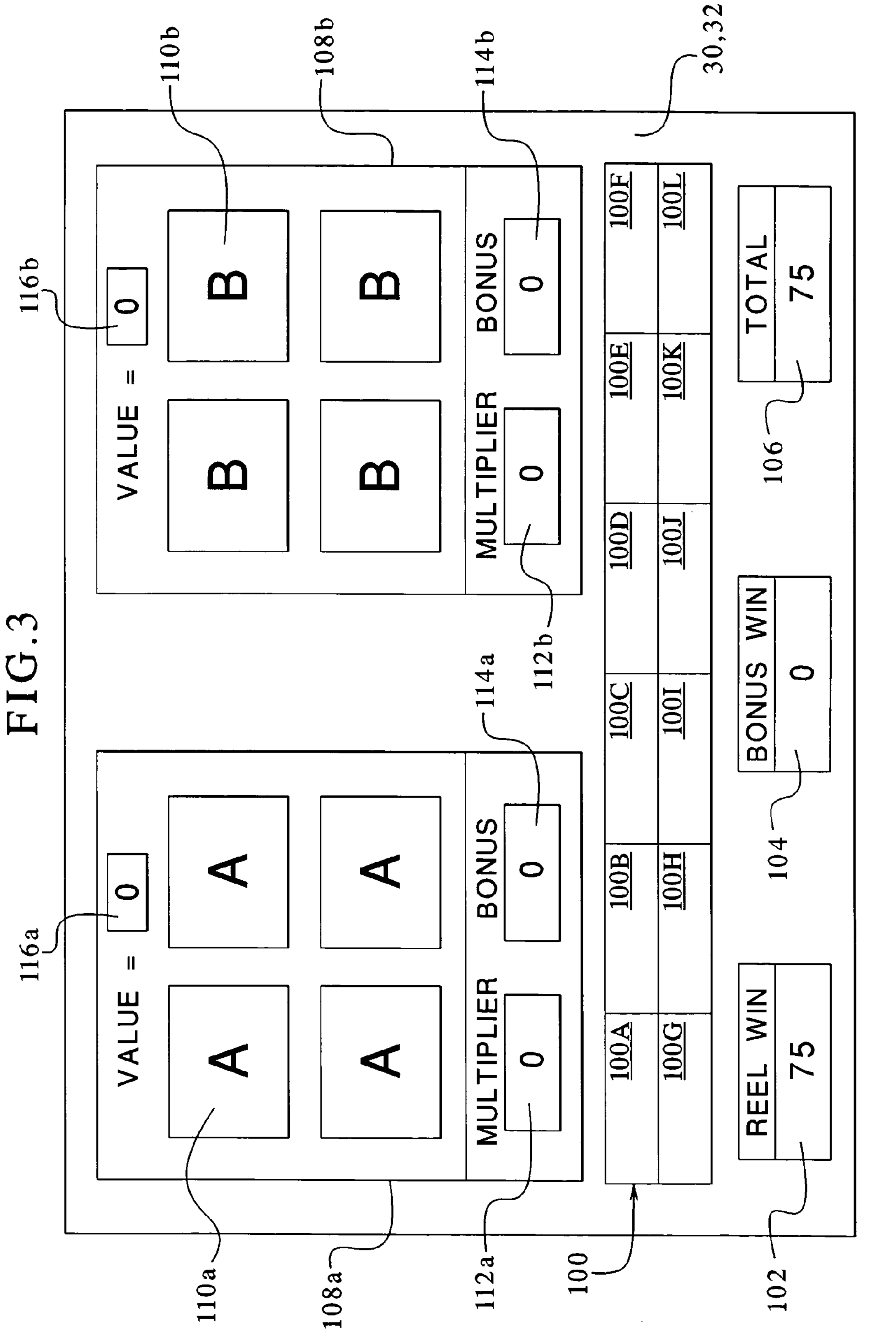
FIG. 3 is an enlarged front elevational view of one of the display devices of FIGS. 1A and 1B, which illustrates one general embodiment of the present invention.
Figure 4:
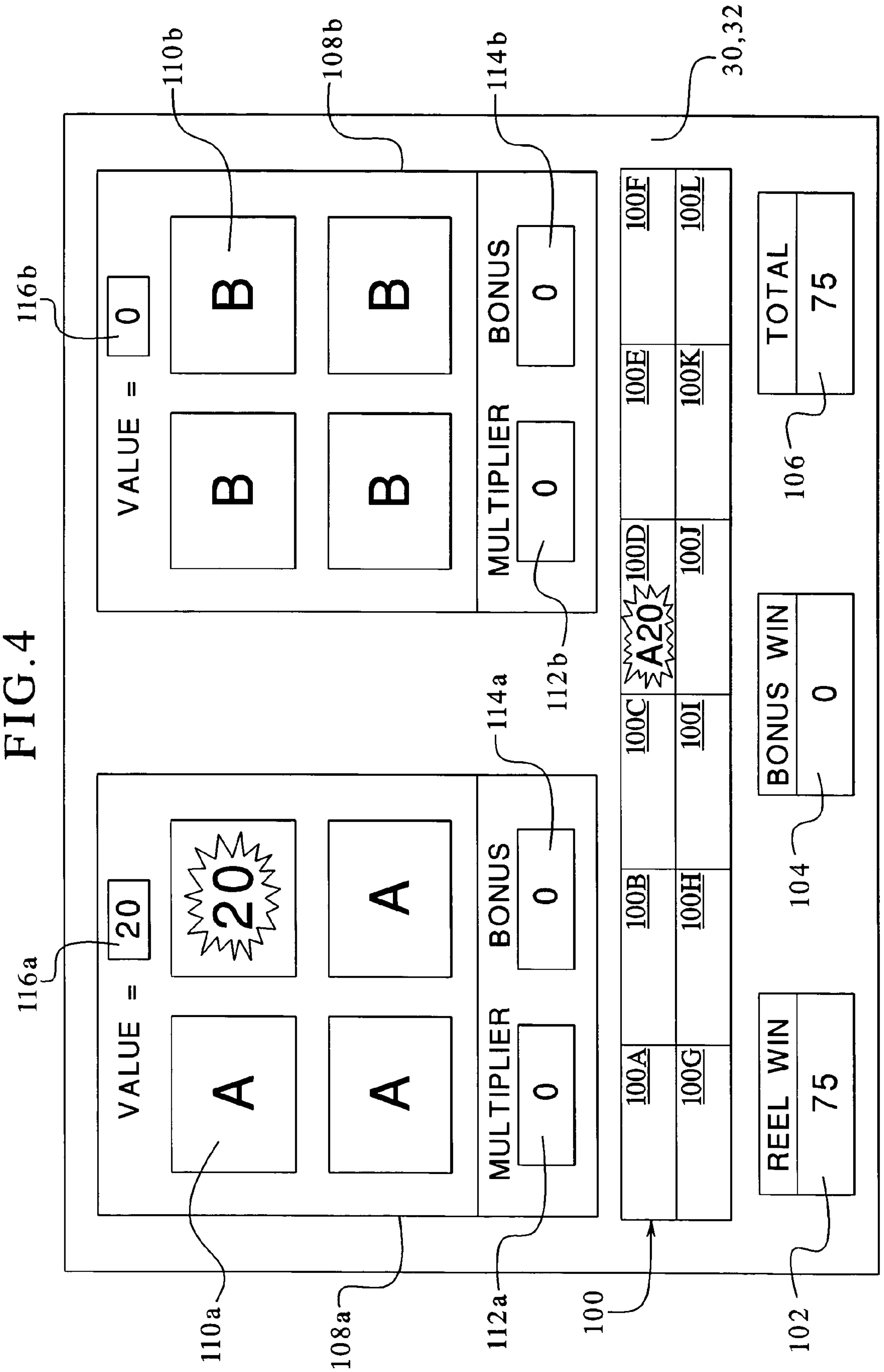
FIG. 4 is an enlarged front elevational view of one of the display devices of FIGS. 1A and 1B illustrating a first selection by a player.

Referring now to FIG. 3, one general embodiment of the present invention includes a display on a display device 30 or 32 having a plurality of masked selections 100 (including selections 100*a*, 100*b*, 100*c*, 100*d*, 100*e*, 100*f*, 100*g*, 100*h*, 100*i*, 100*j*, 100*k* and 100*l*) and at least two sets 108*a* and 108*b*. The selections 100 are preferably simulated selections on the display device 30 or 32, and the display device preferably includes a touch screen 50 and associated touch screen controller 52 (see FIG. 2). Each selection is a separate area of the display device adapted such that when a player touches an area, the touch screen 50 and controller 52 send a discrete input to the processor 38.

The selections may alternatively be electromechanical input devices 44 mounted to the cabinet of the gaming device 10 (see FIG. 2). The electromechanical selections are adapted such that when a player touches or presses a selection, the input device 44 typically closes a circuit (not illustrated), which sends a discrete input to the processor 38. One preferred embodiment of the present invention includes twelve selections, 100*a* through 100*l* as indicated above; however, the present invention may include any suitable number of selections. All of the selections are preferably masked, although it should be appreciated that certain selections may not be masked. Any symbol or indicia could be used in connection with a masked selection as desired by the implementor.

The paid display 102 is preferably simulated on the display device 30 or 32, as illustrated, but may alternatively be an electromechanical device mounted to the cabinet of the gaming device 10. The paid display 102 indicates the value of a recent award paid to the player and is distinguishable from the credit display 16, which shows the recent award plus the player's previous total award.

The bonus game display 104 shows the award received by a player for completing a set or finishing the game. In addition, the total display 106 shows the total credits that the player received in the bonus game, which is the sum of the paid display 102 and the bonus game display 104.

In the preferred embodiment, each set 108*a* and 108*b* preferably includes a plurality of components, and specifically a plurality of value components 110*a* and 110*b*, respectively, having symbols or component identifiers associated with each set, at least one modifier component 112*a* and 112*b*, respectively, and at least one bonus component 114*a* and 114*b*, respectively. Each set includes at least one component and preferably includes a plurality of components as desired by the implementor. The components may be black or related to indicia such as symbols, which may be letters, numbers, shapes or any other characteristic desired by the implementor. The player generates the value components displayed in the sets by picking the selections. When a player generates all the value components located within a set, the bonus game ends. Thus, a player's objective is to complete the set having the highest award and receive the award associated with that set. Preferably an award consists of credits, but the award may include other types of awards such as merchandise as desired by the implementor of the game.

As shown in FIG. 3, the sets 108*a* and 108*b* each include at least one value component. Sets 108*a* and 108*b* each include four value components 110*a* and 110*b*, respectively, but it should be appreciated that a set may include one value component or several value components. The sets 108*a* and 108*b* may also include other components. In FIG. 3, the sets 108*a* and 108*b* include modifier components 112*a* and 112*b*, respectively, and bonus components 114*a* and 114*b*, respectively. These components are preferably simulated indicators on the display device 30 or 32, as illustrated, and are alternatively electromechanical devices mounted to the cabinet of the gaming device 10. Each set 108*a* and 108*b* also includes total value displays 116*a* and 116*b*, respectively, for displaying the total value of each set.

The modifier component includes any modifiers such as multipliers that the player receives for that set. The modifiers may be any mathematical operation, calculation, value or factor desired by an implementor. Preferably, the modifier will be a multiplier. Modifiers may be associated with one set or more sets. It is contemplated that a player may receive a modifier in each set, one set or no sets. A modifier modifies a player's total value for a set. Therefore, the modifier changes the award for the set and enhances the player's excitement and enjoyment of the game.

The bonus component includes bonuses such as bonuses that a player receives during a game. The bonuses may be associated with one set or several sets within a game. In a game, a player may receive bonuses in each set or in all of the sets. Once a set is complete, the bonuses are added to the value components to attain a total award for a set.

The set value displays 116*a* and 116*b* displays the total value of the sets 108*a* and 108*b*, respectively, where the total value is determined as the sum of the value components and any bonuses, modified by any modifiers. The total value is preferably the award associated with the set. Thus, when a set is completed by a player and the game ends, the award shown in the set value display in the set provided to the player is transferred to the bonus win game display 104.

FIG. 3 illustrates one embodiment of a display device 30 or 32, as it may appear to a player when the game begins. The value components 110*a* and 110*b* in the sets 108*a* and 108*b* may be individually generated (i.e., a selection relates to a specific component) or generically generated (i.e., a selection relates to any value component in the set). The selections 100 are preferably masked when the game begins. The selections 100 provide the components as a player picks the selections. The selections are unmasked as the selections are picked. After being picked, the selections preferably remain unmasked until a set or required components of a set are completed and the game ends. Alternatively, a selection may be re-masked and returned to the group of selections the player can choose from.

The modifier components 112*a* and 112*b*, bonus components 114*a* and 114*b* and the set values 116*a* and 116*b* all begin the game at a predetermined value. In addition, the bonus win game display 104 and the total award display 106 start at a predetermined value. The paid display 102 starts with a value associated with a previous game, games such as the bonus triggering game.

FIGS. 4 through 9 illustrate an example play of the game from beginning to end, which occurs when a set is completed by a player. In FIGS. 4 through 9, only six picks are needed to complete the game. It should be appreciated that more or less picks may be needed to complete a game. The number of picks needed to complete a game depends on the number of sets and the number of components in each set (including the components needed to complete a set).

The player starts the game by picking one of the masked selections 100. In this example, the player picks the selection 100D which is a value component. Each value component preferably has with a set indicator and a value. It should be appreciated that a value component may be associated with a set indicator, a value or any combination of indicators and values. In this example, the value component 110D has or is associated with an indicator "A" for the first set 108*a* and a value of "20." The value component is transferred to the first set 108*a* based on the set indicator. Once the value component is transferred to the first set 108*a*, the set value display 116*a* shows the present value of the first set, which is the cumulative value of the value components 110*a*, any bonuses in the bonus component 114*a*, modified by any modifiers in the modifier component 112*a*. In this example, the value of the bonus component 114*a* and the modifier component 112*a* are zero, therefore the set value display 116*a* shows the present value of the first set 108*a* after the first pick by the player, which is twenty.

Figure 5:
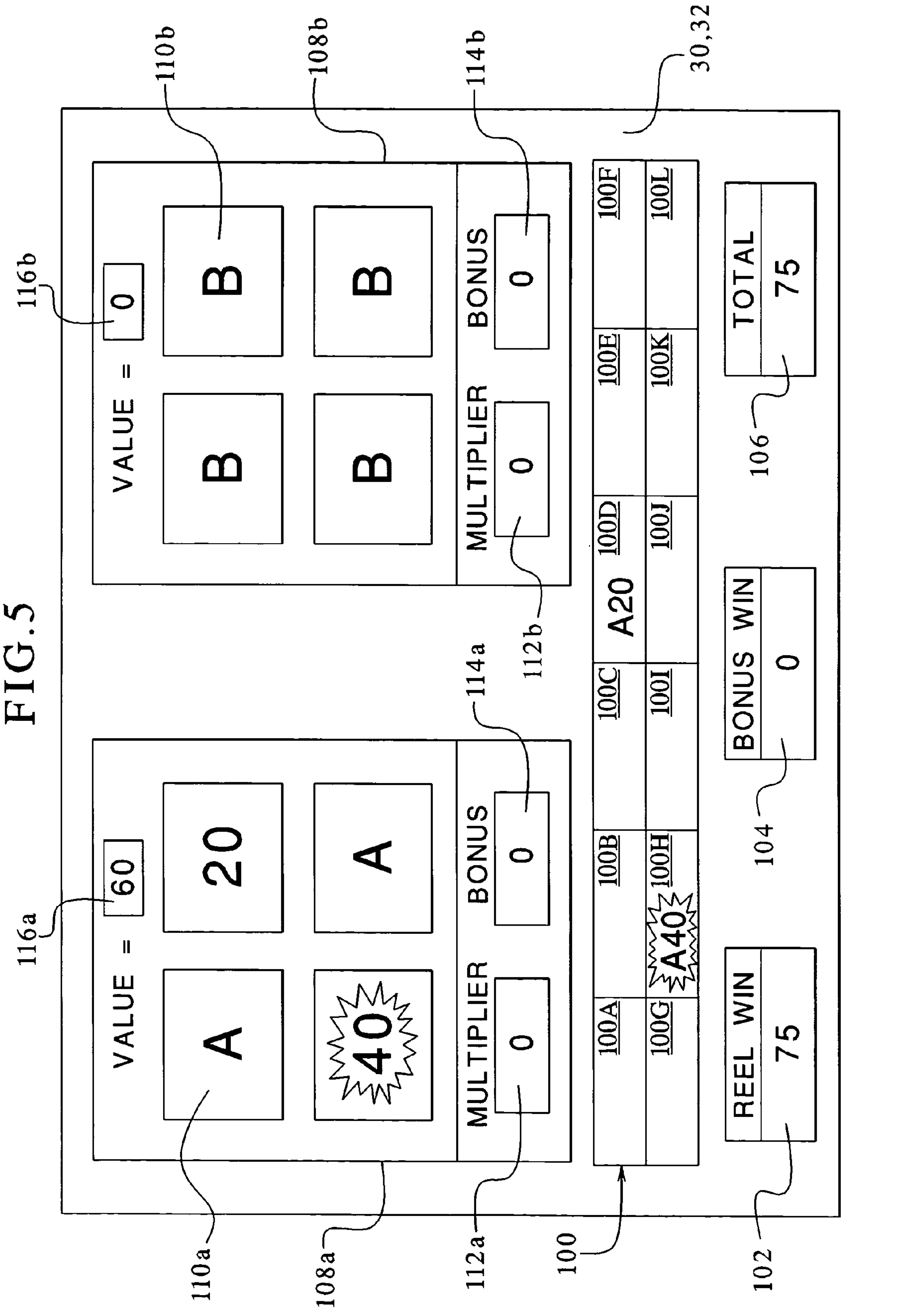
FIG. 5 is an enlarged front elevational view of one of the display devices of FIGS. 1A and 1B illustrating a second selection by a player.

FIG. 5 illustrates the second pick by the player in the game. The player picks selection 100H which is a value component which is associated with the first set 108*a* and has a value of "40." The second value component is transferred to the first set 108*a* and the total value or award for the set is shown in the set value display 116*a* which is sixty (i.e., the cumulative value of the value components, bonuses and modifiers associated with the first set 108*a*).

Figure 6:
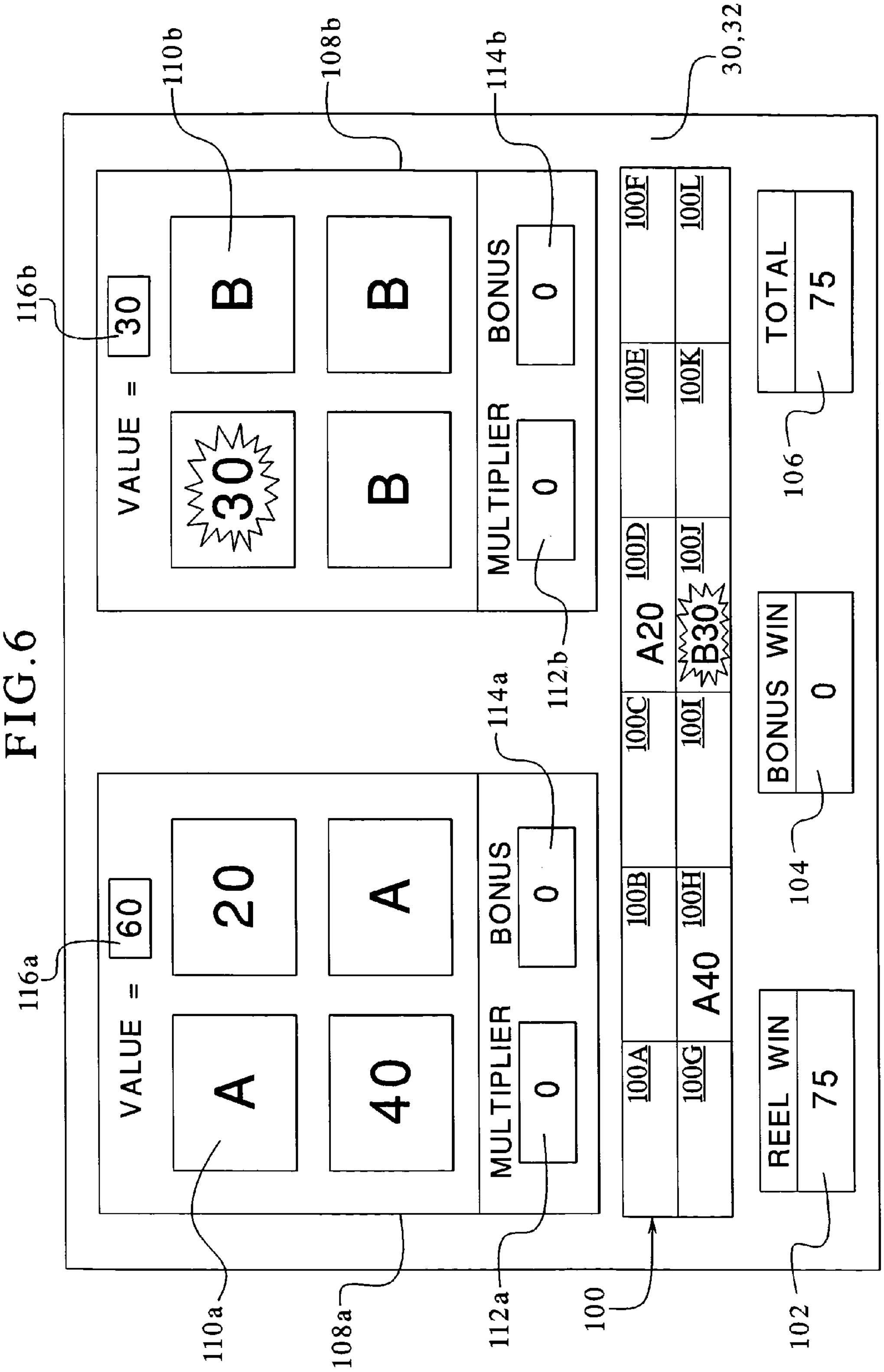
FIG. 6 is an enlarged front elevational view of one of the display devices of FIGS. 1A and 1B illustrating a third selection by a player.

FIG. 6 illustrates the player third selection 100J. The third selection 100J display a value component which has an indicator "B" that associates this component with the second set 108*b*. The value component has a value of "30" which is transferred to set 108*b*. The set value display 116*b* for the second set 108*b* shows the present value for the set. At this point, the second set 108*b* has a total value or award of thirty, which is the sum of any value components 110*b* and bonus components 114*b*, modified by the modifier component 112*b* for that set.

It should be appreciated that a player may complete either the first set 108*a* or the second set 108*b*. In the embodiment, a set is completed when all of the value components in the set have values. Preferably, the sets are not completed at the same time. If they are, both sets could be provided to the player or an alternative award may be provided to the player. The player's goal is to complete the set that will give the player the highest value for the game.

Figure 7:
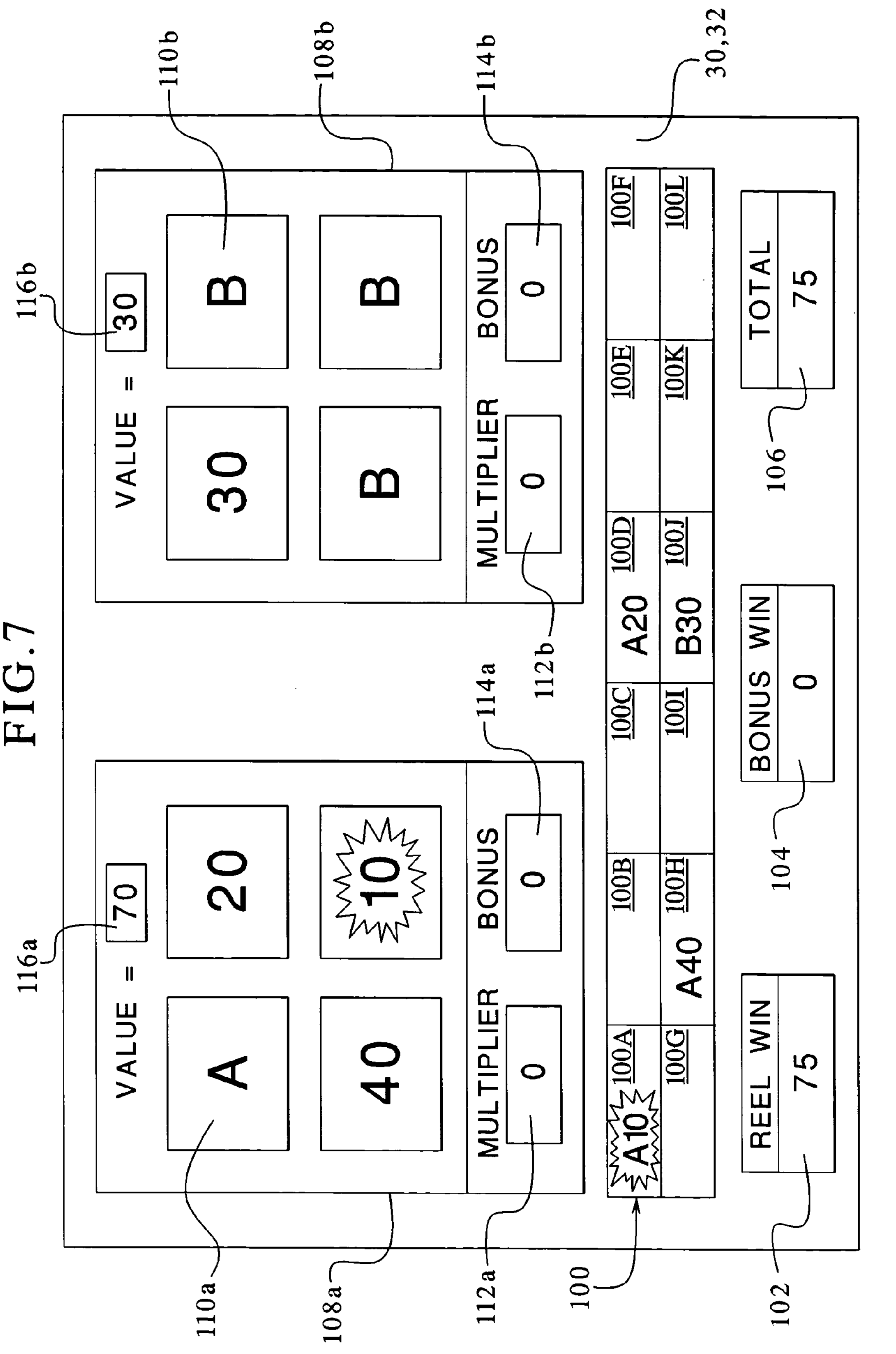
FIG. 7 is an enlarged front elevational view of one of the display devices of FIGS. 1A and 1B illustrating a fourth selection by a player.

FIG. 7 illustrates the player's fourth selection 100A, which provides a value component that includes an identifier associated with the first set 108*a*. The value of the value component is transferred to the first set 108*a*, as illustrated. The value of the first set 110*a* becomes seventy, as displayed in the set value display 116*a*.

Figure 8:
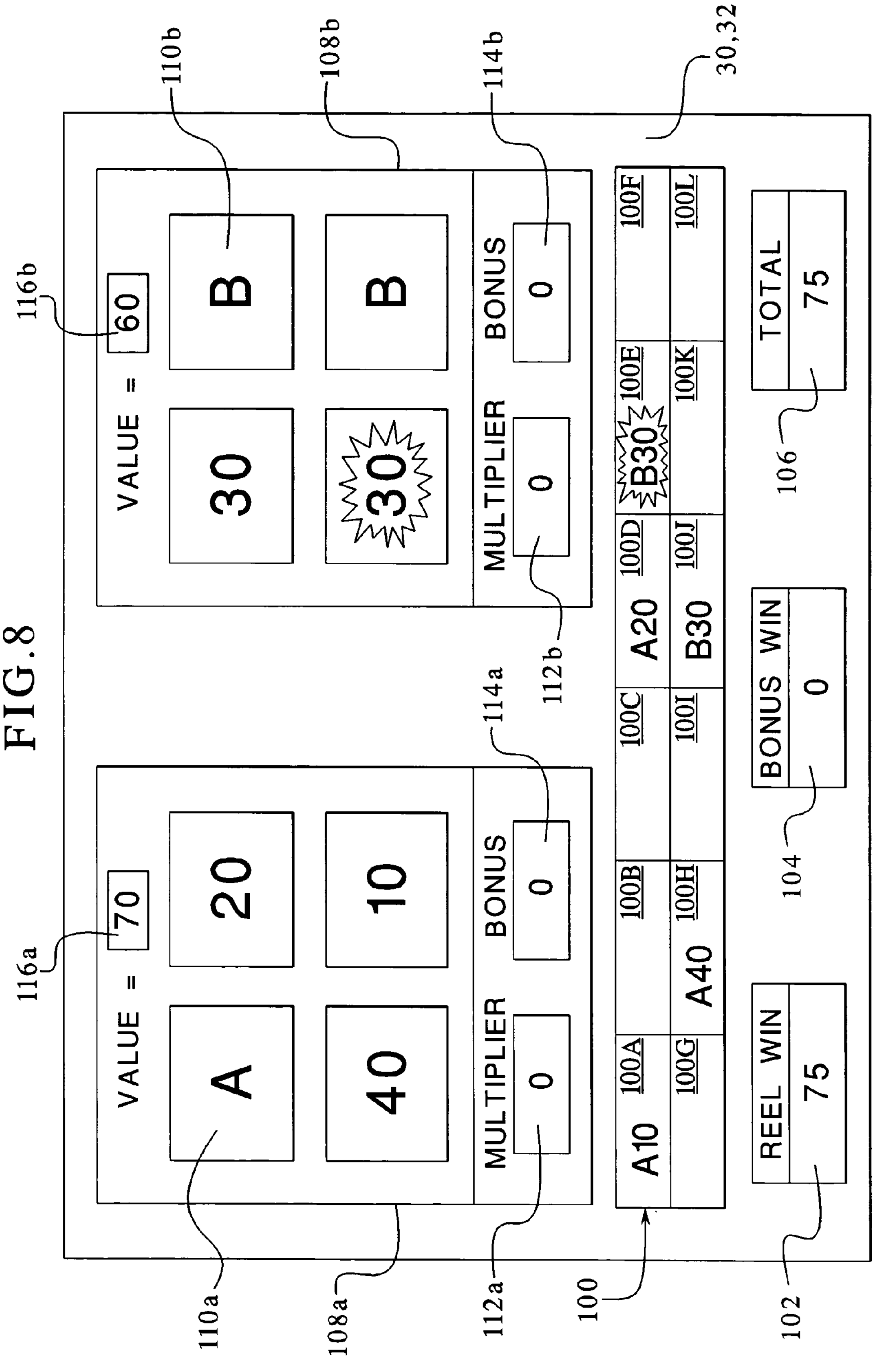
FIG. 8 is an enlarged front elevational view of one of the display devices of FIGS. 1A and 1B illustrating a fifth selection by a player.

FIG. 8 illustrates the player's fifth selection 100E which provides a value component which is associated with the second set 108*b*. The value "30" of the value component is transferred to the second set 108*b* and added to the total value of that set or shown in the set value display 116*b*.

Figure 9:
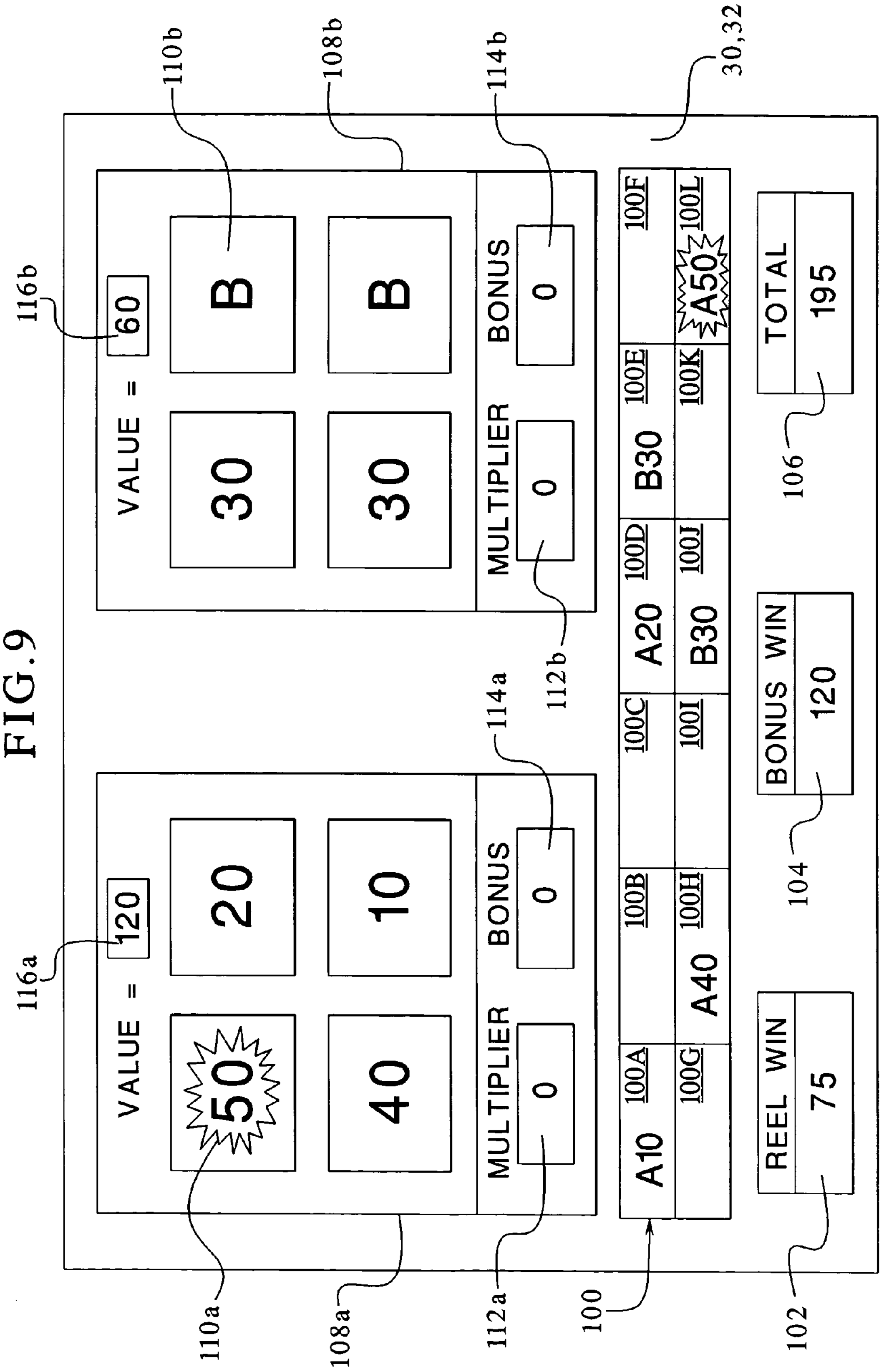
FIG. 9 is an enlarged front elevational view of one of the display devices of FIGS. 1A and 1B illustrating a final selection by a player that completes a set.

FIG. 9 illustrates the player's sixth selection 100L, which provides a value component associated with the first set 108*a*. The value "50" is transferred to the first set 108*a*, as illustrated. The value of the first set 108*a* is one hundred twenty, as displayed in the set value display 116*b* for the first set 108*a*. The present value of the first set 108*a* is the sum of all four value components and any bonus components for that set, modified by any modifier components for that set. In this example, there are no bonus or modifier components, therefore the total award for set 108*a* is the sum of the value components 110*a*. It should thus be appreciated that the present invention can be employed with value components and without modifier, bonus or other components.

The sixth pick by the player was the final pick of the game because this pick completed the first set 108*a* which was the requirement of this embodiment. Once a set is complete in the preferred embodiment, the game ends and the player receives the total value or award associated with that set. In this example, the player receives the value indicated in the set value display 116*a* for set 108*a*, which is one hundred twenty. This value is now transferred to the bonus game display 104. Since the game has ended, the value in the paid display 102 is added to the value in the bonus game display 104 to give the player their total award shown in the total award display 106. In this example, the player receives seventy-five plus one hundred twenty to give them a total award of one hundred ninety-five.

It should be appreciated that the player could have completed the second set 108*b* before the first set 108*a*. Therefore, the outcome of the game is dependent on the selections 100 that the player picks during the game. In some games, the player may desire to complete one set before another because that set has a higher total award than the other set or sets. The uncertainty related to the completion of the sets enhances the player's excitement and enjoyment of the game.

In another embodiment of the game, a player picks a selection 100 and receives a bonus component associated with a particular set. The bonus component can be added to one or more sets or to all of the sets in a game. A game may have no bonus components or as many bonus components as desired by the implementor of the game, provided that the sets can be completed. It should also be appreciated that a bonus component can be used as a partial or complete set completion component (i.e., picking a bonus component is required to complete a set, is part of completing a set, equals two or more value components toward completion, or automatically completes a set).

Figure 10:
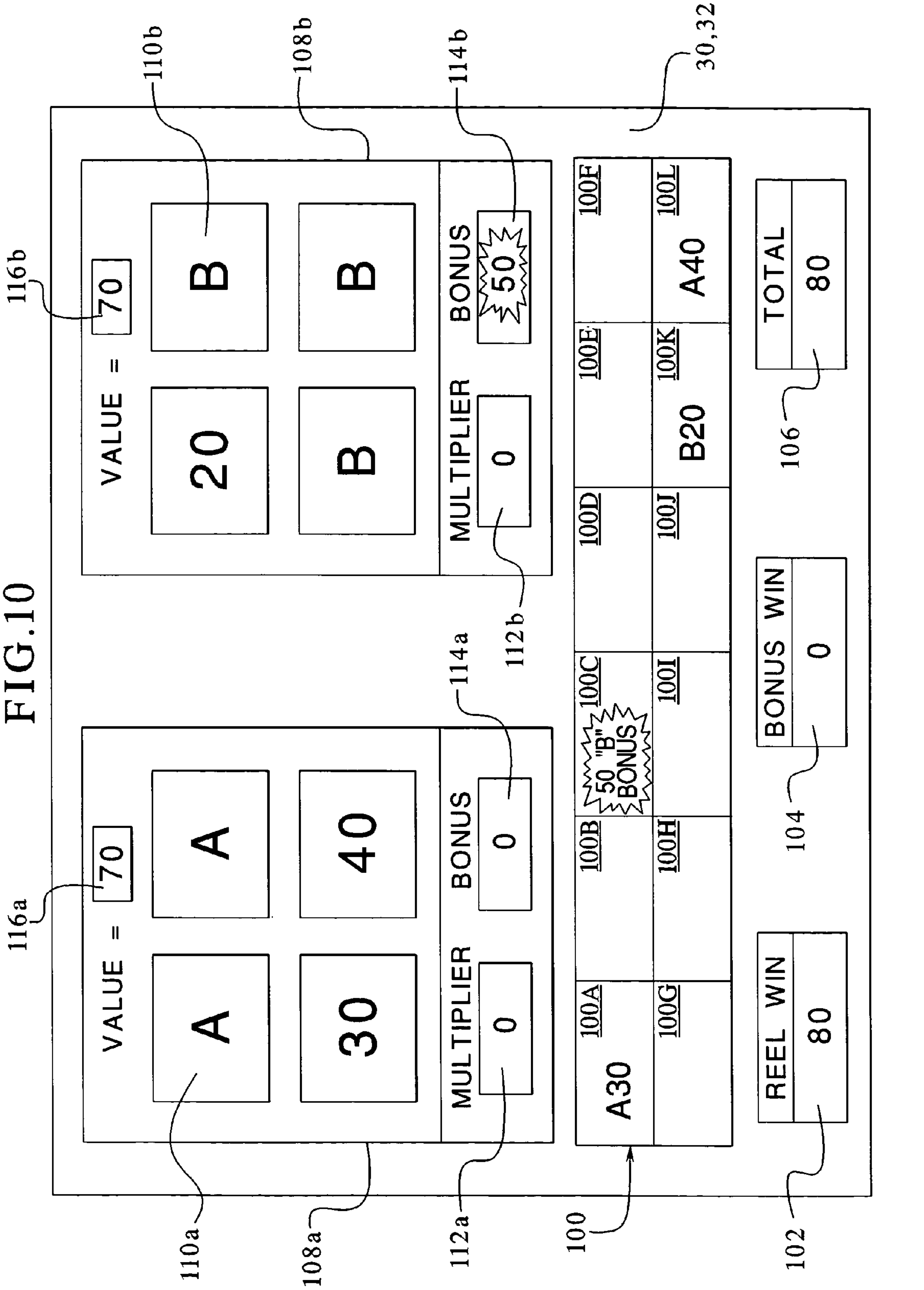
FIG. 10 is an enlarged front elevational view of one of the display devices of FIGS. 1A and 1B illustrating a further bonus component selected by a player.

FIG. 10 illustrates an example game where a player picks a selection 100C that provides a bonus component which includes a set identifier, a bonus identifier "Bonus" and a value "50" associated with it. The set identifier "B" Bonus associates the bonus component with a set. It should be appreciated that a bonus component may be associated with one set, several sets or all of the sets in a game. In FIG. 10, the bonus component is only associated with set 108*b*, and therefore the value of the bonus component is transferred to that set. The bonus component's associated value is fifty and this value is added to the total award for the set in the example illustrated in FIG. 10.

The bonus components add to the total award of a set and increase the awards that a player can win in a game. In some circumstances, the bonus components may make one set more valuable than another set. Since the player's goal is to complete the set with the highest value, the bonus components create larger awards and thereby enhance a player's excitement and enjoyment of the game.

Figure 11:
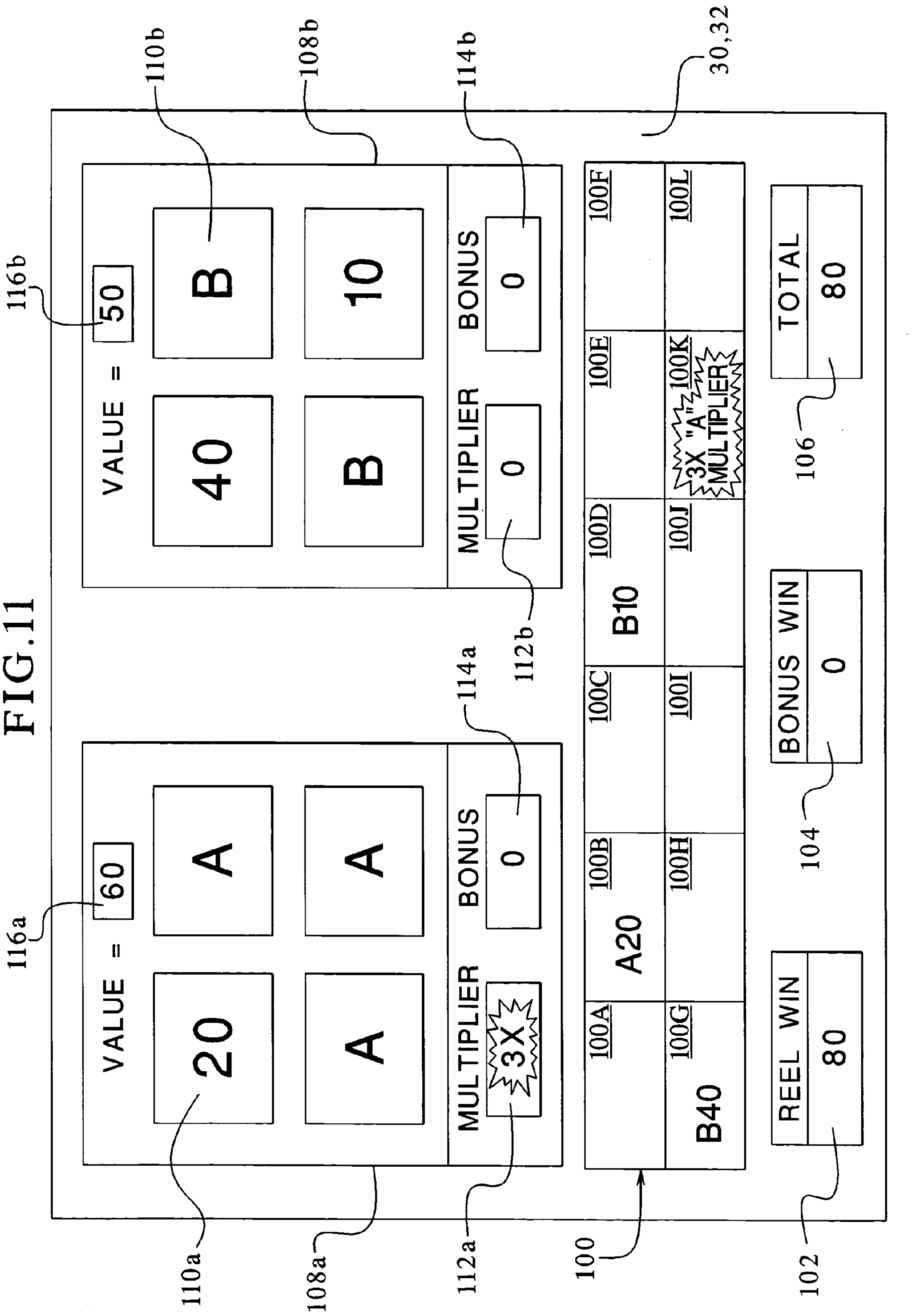
FIG. 11 are enlarged front elevational views of one of the display devices of FIGS. 1A and 1B illustrating a modifier component selected by a player.

FIG. 11 illustrates another example game where a player picks selection 100K. The selection provides a modifier component which has a set identifier "A" that associates the modifier component with set 108*a*, a modifier identifies "Multiplier" that identifies the type of the selection, and modifier "3×." It should be appreciated that a modifier component may be associated with one set, several sets or all of the sets in a game. In FIG. 11, the modifier component is only associated with set 108*a*, therefore the modifier component is transferred to that set. The modifier component is in this example a multiplier, but may be any other type of modifier that changes the award in a set as discussed above.

The award for set 108*a*, including any bonus components, is modified by the modifier to achieve the award for that set as shown in the set value display 116*a*. In this example, the modifier is a multiplier "3×", which means that the sum of the value components and the bonus components in set 108*a* will be multiplied by three to achieve the award for that set.

The modifier component 112*a* increases the total award for the set and increases the award that a player can win in the game. In some circumstances, the modifier may make one set more valuable than another set. The player's goal is to complete the set with the highest value. Therefore, the modifier component increases the awards received by a player and thereby enhances a player's excitement and enjoyment of the game.

Figure 12:
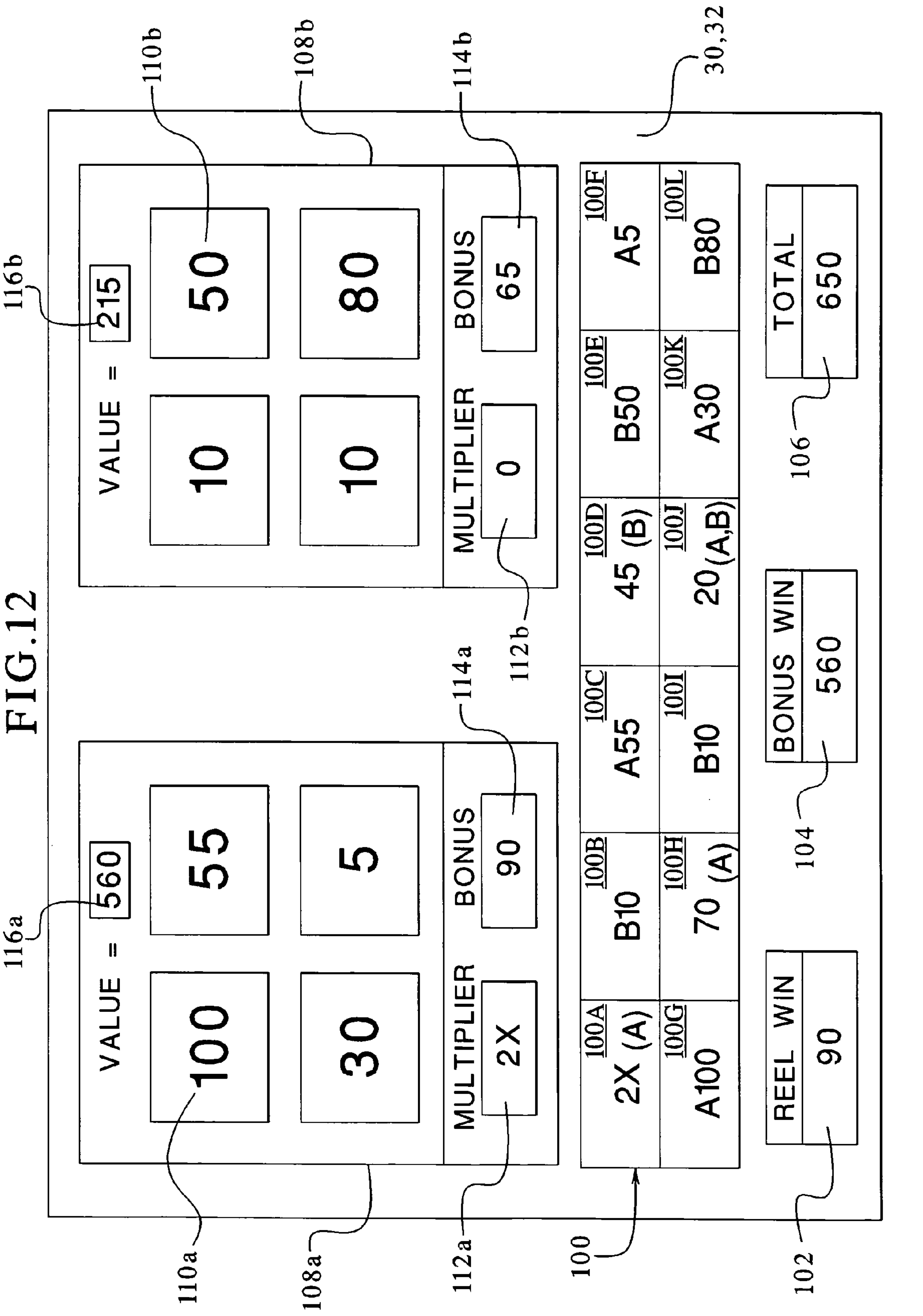
FIG. 12 is an enlarged front elevational view of one of the display devices of FIGS. 1A and 1B illustrating unmasked components and selections.

FIG. 12 illustrates all of the selections revealed. In this example, the present invention includes twelve selections 100 that provide various components and values. The selections provide value components (such as 100*b*, 100*c*, 100*e*, 100*f*, 100*g*, 100*i*, 100*k* and 100*l*) and preferably four value components for each set. The selections also include three bonus components (such as selections 100*d*, 100*h* and 100*j*) and one modifier component (such as selection 100*a*). It should be appreciated that the selections may have more or less than twelve selections and that the number of value components, bonus components and modifier components vary as desired by an implementor.

Referring now to FIG. 13, an award table 118 illustrates at least a portion of an award database that the present invention may employ to generate an award. The award table 118 includes a plurality of awards 120 having any desired predetermined distribution of values. The awards 120 may include bonuses, modifiers or other items of value such as a number of picks from an award pool (not shown). The present invention includes the game being enabled or not being enabled to randomly select an award 120 a plurality of times.

The present invention also includes adapting the game to randomly generate awards 120 from the award table 118 using one of two methods. In a first award generation embodiment, the game randomly assigns an award to each of the selections 100 (FIG. 3) at the beginning of the game. For example, the game randomly assigns the 10 award to a first selection, the 20 award to a second selection, etc., before the player begins picking selections 100. The game then generates an award depending upon which selection 100 the player picks.

In a second award generation embodiment, the game randomly assigns an award 120 to a pick of an order. That is, the player makes a first pick, a second pick, a third pick, etc. The game randomly assigns, e.g., the 10 award to the first pick, the 20 award to the second pick and so on. The present invention includes the game randomly assigning awards to a plurality or all of the picks before the player begins picking selections 100 or alternatively assigning each award directly to a selection 100 after the player picks a selection.

In FIG. 13, the award table 118 illustrates at least a portion of an award database that the present invention employs to generate an award. The awards 120 each include an associated likelihood percentage 122 that the processor 38 (see FIG. 2) utilizes to select a particular award. The game contemplates probabilities or likelihood percentages 122 having any desired distribution, wherein the percentages preferably add to 100%. For example in award table 118, the game is twice as likely to select one of the 15, 20, or 25 awards as it is to select either the 10, 30 or 35 awards.

Similarly, the award table 118 may be employed for each component in a game, including the bonus and modifier components. It should be appreciated that the award tables may employ the same awards or different awards, as well as have the same award likelihood percentages or different award likelihood percentages. Therefore, each award table 118 may have different award values 120 and different award distribution percentages 122.

FIG. 14 illustrates another example of how the game may randomly distribute components within the game based on likelihood percentages. The component distribution table 124 is employed by the processor 38 to distribute components to a particular set or sets based on probabilities or likelihood percentages 126. The component distribution table 124 includes as many set locations 128 as there are sets 108 in a game. The set locations 128 each include an associated likelihood percentage 126 that the processor 38 (see FIG. 2) utilizes to select the particular set location. The game contemplates probabilities or likelihood percentages 126 having any desired distribution, wherein the percentages preferably add to 100%. In this example, a component such as a modifier component is twice as likely to be assigned to set A or set B as it is to both sets A and B. It should be appreciated that a game may employ the same likelihood percentages 126 or each component may have its own component distribution table 124 with likelihood percentages 126.

Preferred Multiple Potential Award Game Embodiment

Referring again to FIG. 12, one preferred embodiment of a multiple potential award game is illustrated fully revealed or unmasked on a display device 30 or 32 to show each of its game outcomes. The preferred multiple potential award game includes at least two sets having one or more value components per set, at least one modifier component, at least one bonus component and a plurality of selections 100.

The preferred multiple potential award game requires the player to pick selections until a set is complete. Any player pick of the selections may generate a value component, multiplier component or a bonus component. Each player pick preferably adds value to the award for a set or both sets. It should be appreciated that alternatively, a selection may not affect a set, may reduce the value of a set, or may change one of the components of a set. Once a player completes a set, the player receives the award associated with that set. Alternatively, the player may receive the value of the last set completed, the value of an intermediate set completed, or some award associated with a completed or uncompleted set. The award is added to any awards that a player received from a previous game or games and a new award total is calculated for the player.

Figure 15:
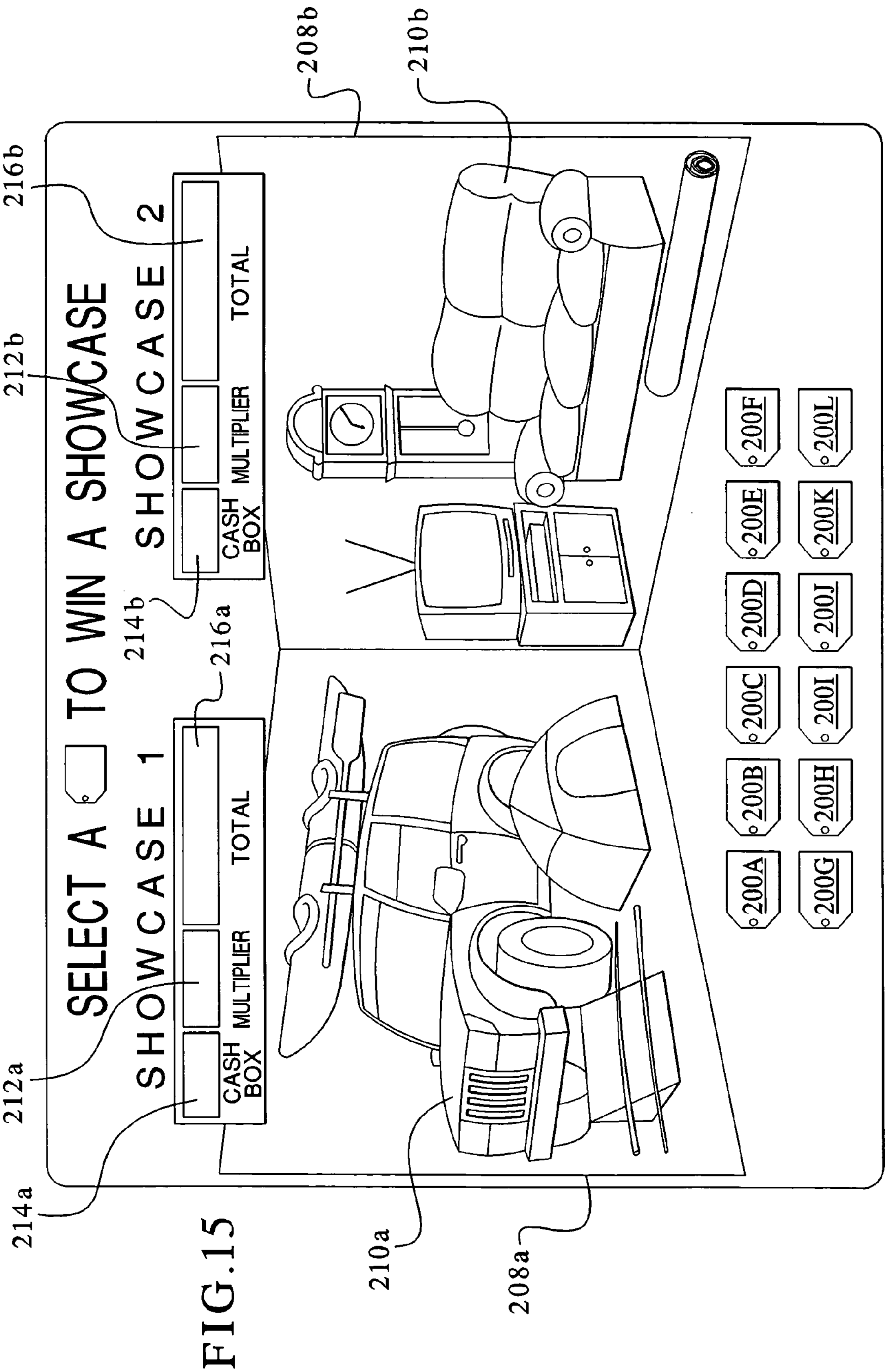
FIG. 15 is an enlarged front elevational view of one of the display devices of FIGS. 1A and 1B illustrating an embodiment of the invention where the value components are different objects which represent values.

FIG. 15 shows a further embodiment of the present invention where the potential award sets 208*a* and 208*b* include value components such as 210*a* or 210*b*, that are objects or items which represent a value. Alternatively, the object could be prizes awarded to the player which is the item itself. In this embodiment, a player picks one of the selections, 200A to 200L. The player's selection reveals an item associated with one set or more than one set. Each item is associated with a value, which is transferred to the associated value component, 210*a* or 210*b*, for each set. The player completes a set or sets by picking all the value components 210*a* or 210*b* for the set. Once a set is completed, the player receives the total value for that set associated with the items in the set.

The total value of a set is based on the bonuses, modifiers and value components picked by the player for that set. The bonus values, if selected, are displayed in the bonus value components 214*a* and 214*b* for each set. Similarly, modifier values such as multipliers, are shown in the modifier components 212*a* and 212*b* for each set. The total value of a set is determined by adding the value components and any bonus values selected by a player. This sum is then modified by any modifier values selected by the player and the resultant total is displayed in the set value components 216*a* and 216*b* for each set.

In FIG. 15, the first set 208*a* includes items associated with an outdoor theme illustrated by the truck, tent, canoe and fishing poles. The second set 208*b* includes items associated with a household theme illustrated by the couch, television, rug and clock. A player picks a selection 200A to 200L. Subsequently, the picked selection reveals a value component from either set 208*a* or 208*b*. It is contemplated that a selection may reveal a value component associated with more than one set. If the player's selection reveals the truck, a value associated with the truck is transferred to the value component 210*a*. If the selection reveals the couch, a value associated with the couch is transferred to the set value component 210*b*. The picked selections may also reveal bonuses and modifiers that add to the potential award for a set.

A player completes a set by selecting each value component within a particular set. For example, if a player picked selections 200 such that they revealed the truck, tent, canoe and fishing poles, the player completes set 208*a*. The total value of the components is added to the bonus values picked by a player and then modified by the modifier value, if any, shown in the modifier components 212*a* 212*b* to achieve the total value of the set as displayed in the set value component 216*a* and 216*b*. The set value component is the total award that the player receives for completing that set.

Figure 16:
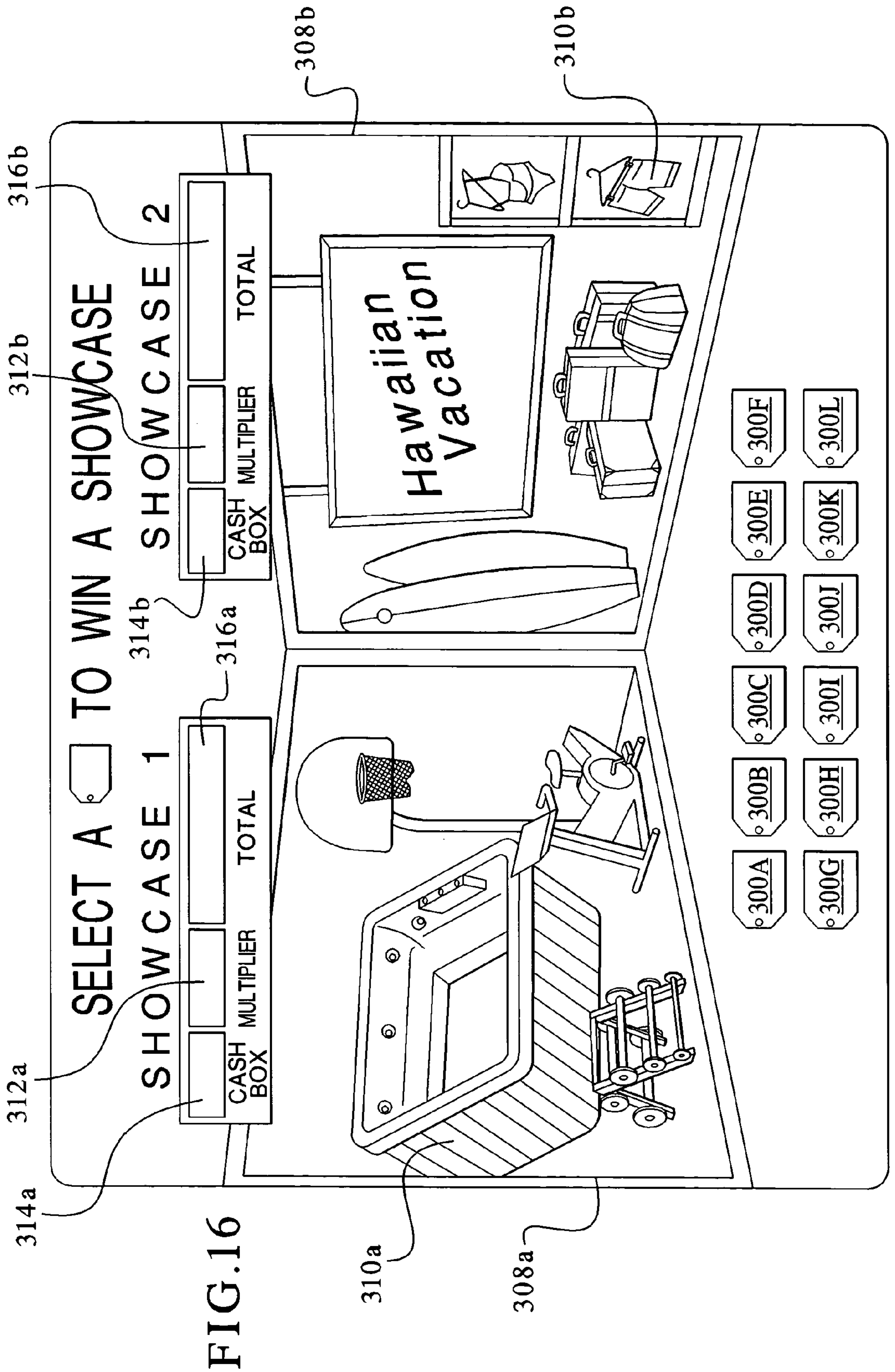
FIG. 16 is an enlarged front elevational view of one of the display devices of FIGS. 1A and 1B illustrating another embodiment of the invention where the value components are different objects which represent values.

FIG. 16 illustrates another embodiment where the value components of set 310*a* are recreational items such as a hot tub, basketball hoop, exercise bike and dumbbells. In set 310*b*, the value components are associated with a trip or vacation and include a Hawaiian vacation, surfboards, luggage and bathing suits.

A player picks the selections 300 until the player completes one of the sets 310*a* or 310*b*. For example, a player may pick selections 300 and reveal the hot tub, basketball hoop, exercise bike and dumbbells. If the player picks these value components before picking all of the value components in set 308*b*, then the player receives the total value of the recreational set 308*a*.

The value of the recreational set 308*a* is the total value of the components of that set. Each component, the hot tub, basketball hoop, exercise bike and dumbbells, are associated with a value. When that component is selected, the component value is transferred to the set value component 310*a* and/or 310*b*. Once the set is completed, the set value component 310*a* or 310*b* is modified by the modifier value, if any, in 312*a* and 312*b*. The total value is then displayed in the set value component 316*a* and 316*b*. The total value shown in the set value component is the award that the player receives for completing that set.

Similarly, if the player completed set 308*b* first by selecting the couch, television, rug and clock, the player receives the award shown in the total value component 316*b*. The total value component is the sum of the value components 310*b* plus any bonus values shown in 312*b*, and then modified by any modifiers selected in the game.

Figure 17A:
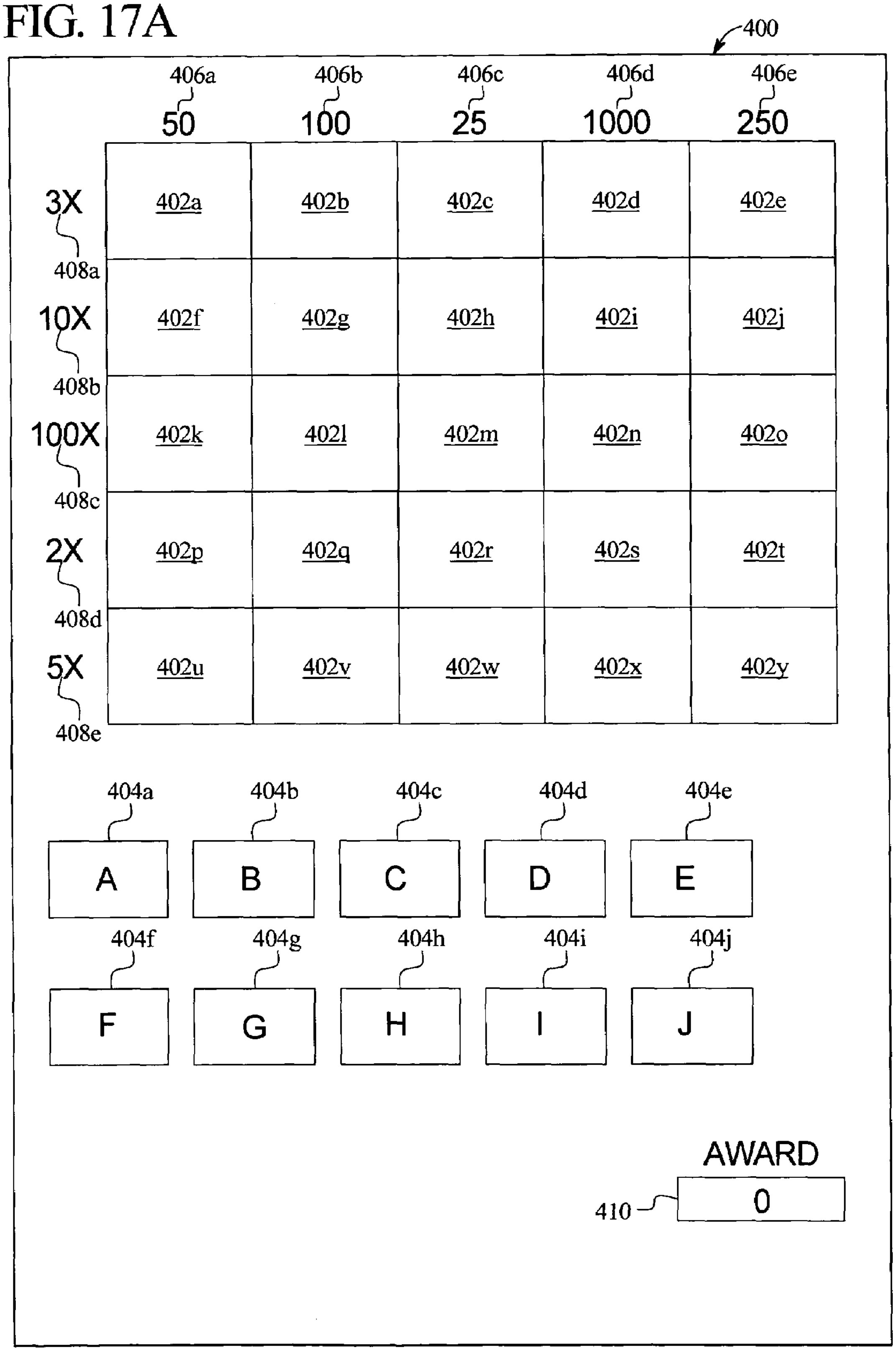
FIGS. 17A, 17B, 17C, 17D, 17E and 17F are front elevational views of one alternative embodiment of the present invention illustrating an award provided based on a designated combination of flagged elements.

Referring now to FIG. 17A, upon initiation of another embodiment of the present invention, the gaming device provides a screen or display 400 which enables a player to make selections to obtain an award. In one embodiment of the present invention, the gaming device provides and displays a plurality of elements or symbols 402*a* to 402*y* arranged in a grid or matrix configuration. Each different position of the matrix or grid is a different element. Each of the elements or symbols are classified or sorted into one or more of a plurality of element groups or sets. It should be appreciated that the gaming device does not initially display or otherwise indicate which elements are in which element groups or sets.

In one embodiment, each of the element groups includes at least one element and at least one of the element groups includes a plurality of elements. In another embodiment, a plurality of the element groups each include a plurality of the elements. In another embodiment, each of the element groups includes a plurality of the elements. In another embodiment, at least one of the element groups includes each of the elements. In one embodiment, the elements in each element group are predetermined, randomly determined, determined based on the player's wager in a primary game, determined from the occurrence of one or more symbols in a primary game or determined based on any other suitable method. In another embodiment, each of the elements is associated with a probability and the gaming device determines which elements to include in which element groups based on the associated probabilities.

As seen in FIG. 17A, the gaming device also provides a plurality of selections 404*a*, 404*b*, 404*c*, 404*d*, 404*e*, 404*f*, 404*g*, 404*h*, 404*i* and 404*j*, represented by letters A, B, C, D, E, F, G, H, I and J, respectively. In one embodiment, each selection is associated with one of the element groups or sets. In another embodiment, at least one the selections is associated with a plurality of the different element groups. In another embodiment, a plurality of the selections are each associated with a plurality of the different element groups. It should be appreciated that the element group or set associated with each selection is masked or otherwise not revealed to the player.

In one embodiment, the gaming device designates one or more elements or combinations of elements as winning patterns of elements. A designated combination or pattern of at least two elements may be any designated pattern, such as a specific number of adjacent elements or grid positions, any of the five vertical columns, any of the five horizontal rows or either of the two diagonals on the matrix. Other designated combinations include the four corners of the matrix, the eight spots immediately surrounding a free space, a circle around a free space, a diamond pattern or a pattern which forms a letter, such as an H pattern, a C pattern or a T pattern. In different embodiments, the designated element, combination of elements or pattern of elements which must be selected is predetermined, randomly determined, determined based on the player's wager in a primary game, determined from the occurrence of one or more symbols in a primary game or determined based on any other suitable method. In this example, each different row and each different column is designated a different combination of elements. In one embodiment, the designated pattern(s) of elements which must be flagged is the same for each play of the game. In another embodiment, the designated pattern(s) of elements which must be flagged is different for each play of the game.

In one embodiment, each different designated combination of elements is associated with an award. In different embodiments, the awards may be any combination of values, credits, multipliers, free picks, free spins, free games, game elements or any other suitable monetary or non-monetary prize. In one embodiment, each of the awards is selected from one or more pools of awards. In another embodiment, each of the awards is selected from one or more ranges of awards. In another embodiment, each of the awards is associated with a probability and each of the awards is selected to be associated with one or more of the elements or symbols based on the associated probabilities. In different embodiments, the awards associated with the elements are predetermined, randomly determined, determined based on the player's wager in a primary game, determined from the occurrence of one or more symbols in a primary game or determined based on any other suitable method. In this example, the five columns from left to right 406_a_, 406_b_, 406_c_, 406_d_ and 406_e_ are associated with award values of fifty, one-hundred, twenty-five, one-thousand and two-hundred-fifty. In this example, the five rows from top to bottom 408_a_, 408_b_, 408_c_, 408_d_ and 408_e_ are associated with award multipliers of three, ten, one-hundred, two and five.

Figure 17B:
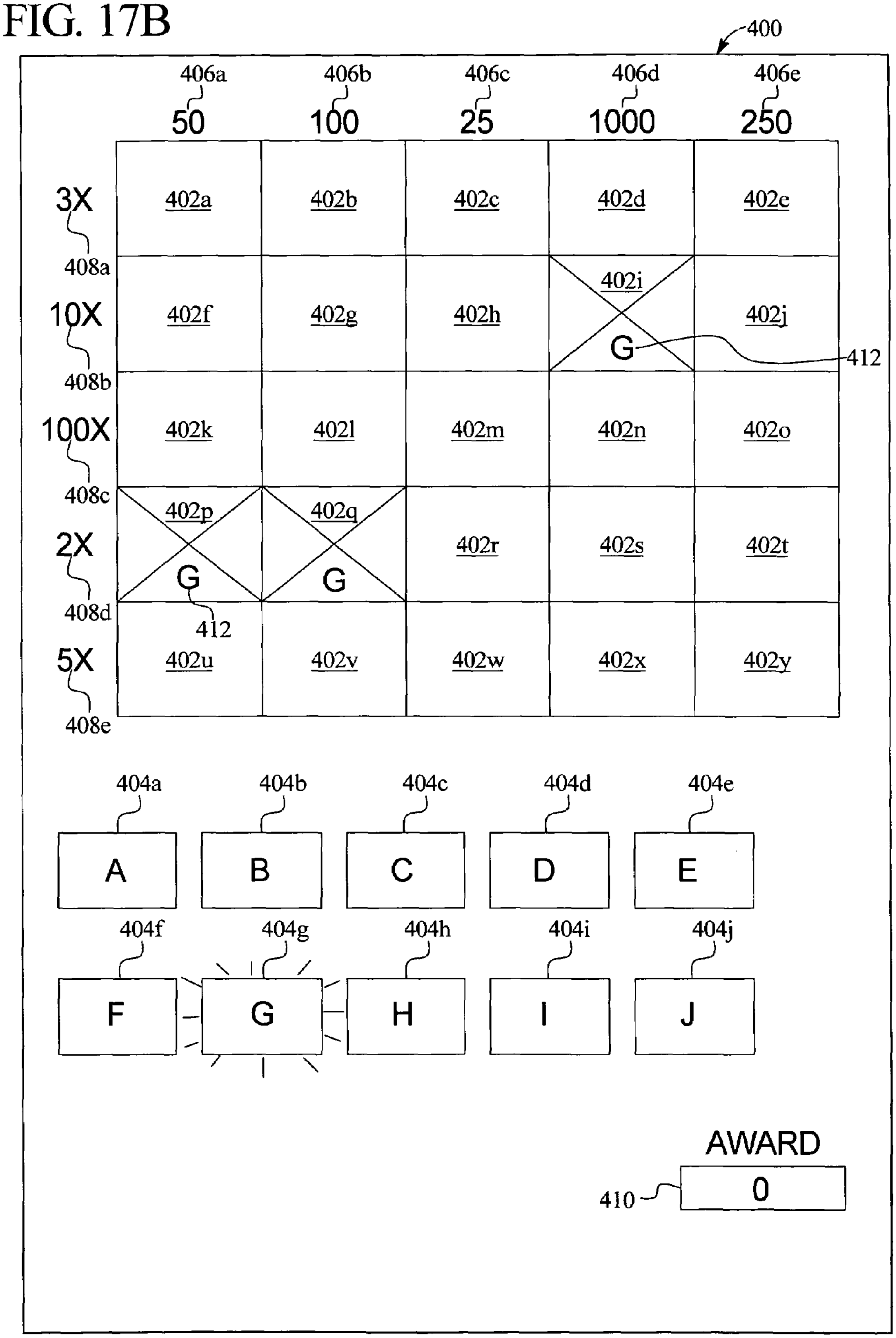

As illustrated in FIG. 17B, the player is enabled to select one of the plurality of selections. Once selected, each of the elements in the element group associated with the player picked selection are marked or flagged. In this example, the player picked highlighted selection 404_g_ and the gaming device marked or flagged elements 402_i_, 402_p_ and 402_q_. After each element is flagged or marked, the gaming device provides an element group indicator 412 to indicate that the marked element is in the element group associated with the player picked selection.

After marking the elements in the element group associated with the player picked selection, the gaming device determines if a designated combination of elements (e.g., a complete row or complete column of elements) are marked or flagged. If each of the elements in a designated combination of elements are not marked or flagged, this embodiment of the selection game continues and the gaming device enables the player to pick another one of the plurality of selections.

Figure 17C:
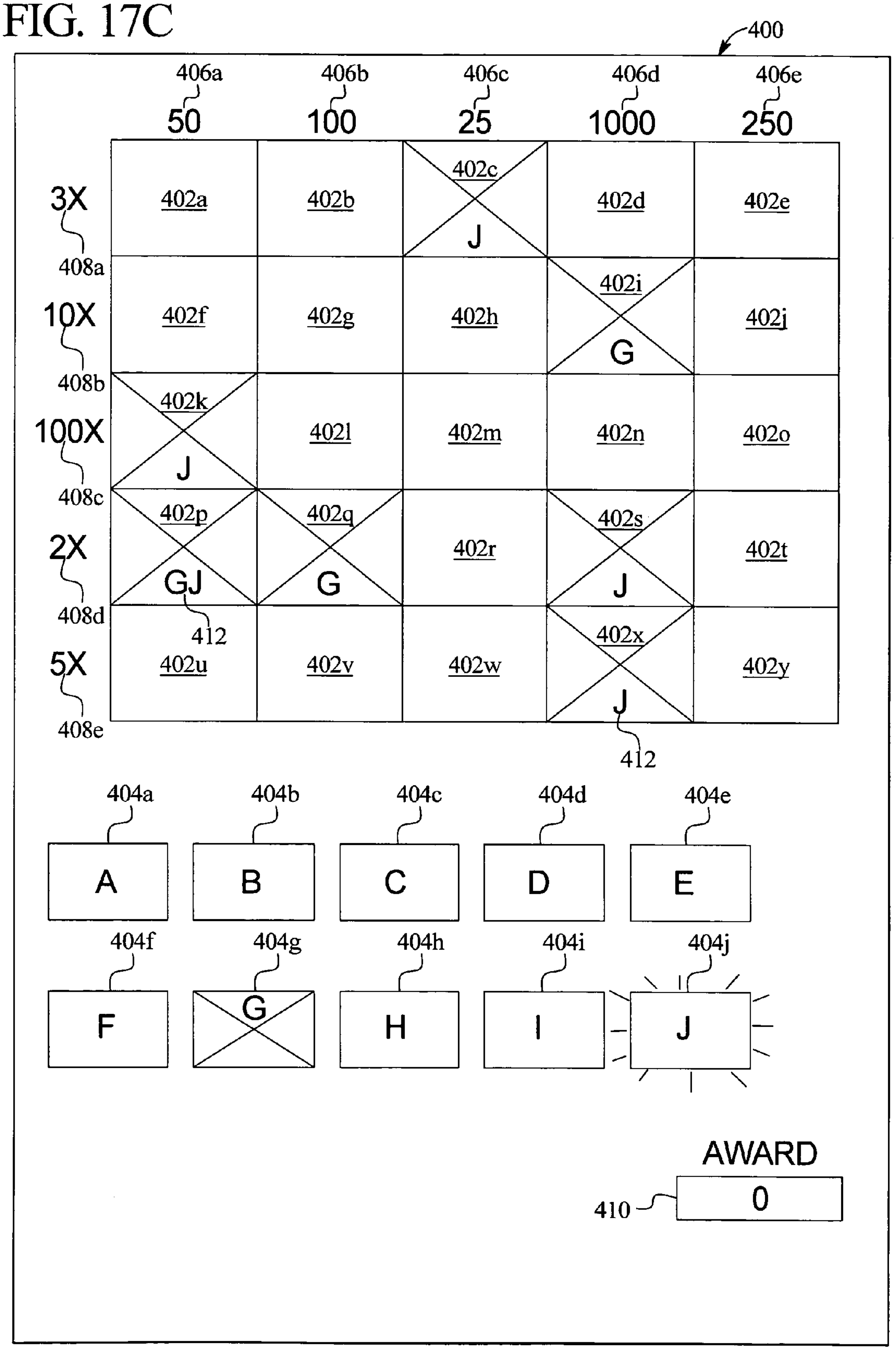

As illustrated in FIG. 17C, as each of the elements in a designated combination of elements are not marked, the player is enabled to pick another one of the plurality of selections to mark or flag at least one of the elements or symbols as described above. In this embodiment, any previously picked selection cannot be picked more than once and thus the player cannot repick selection 404_g_. In this example, the player picked highlighted selection 404_j_ and the gaming device marked or flagged elements 402_c_, 402_k_, 402_s_ and 402_x_. It should be appreciated that while element 402_p_ is in the element group associated with picked selection 404_j_ (i.e., as indicated by the appropriate element group indicator), element 402_p_ was previously flagged (i.e., in the element group associated with selection 404_g_) and thus does not need to be reflagged. After marking the elements in the element group associated with the player picked selection, the gaming device determines if a designated combination of elements (i.e., a complete row or complete column of elements) are marked or flagged.

Figure 17D:
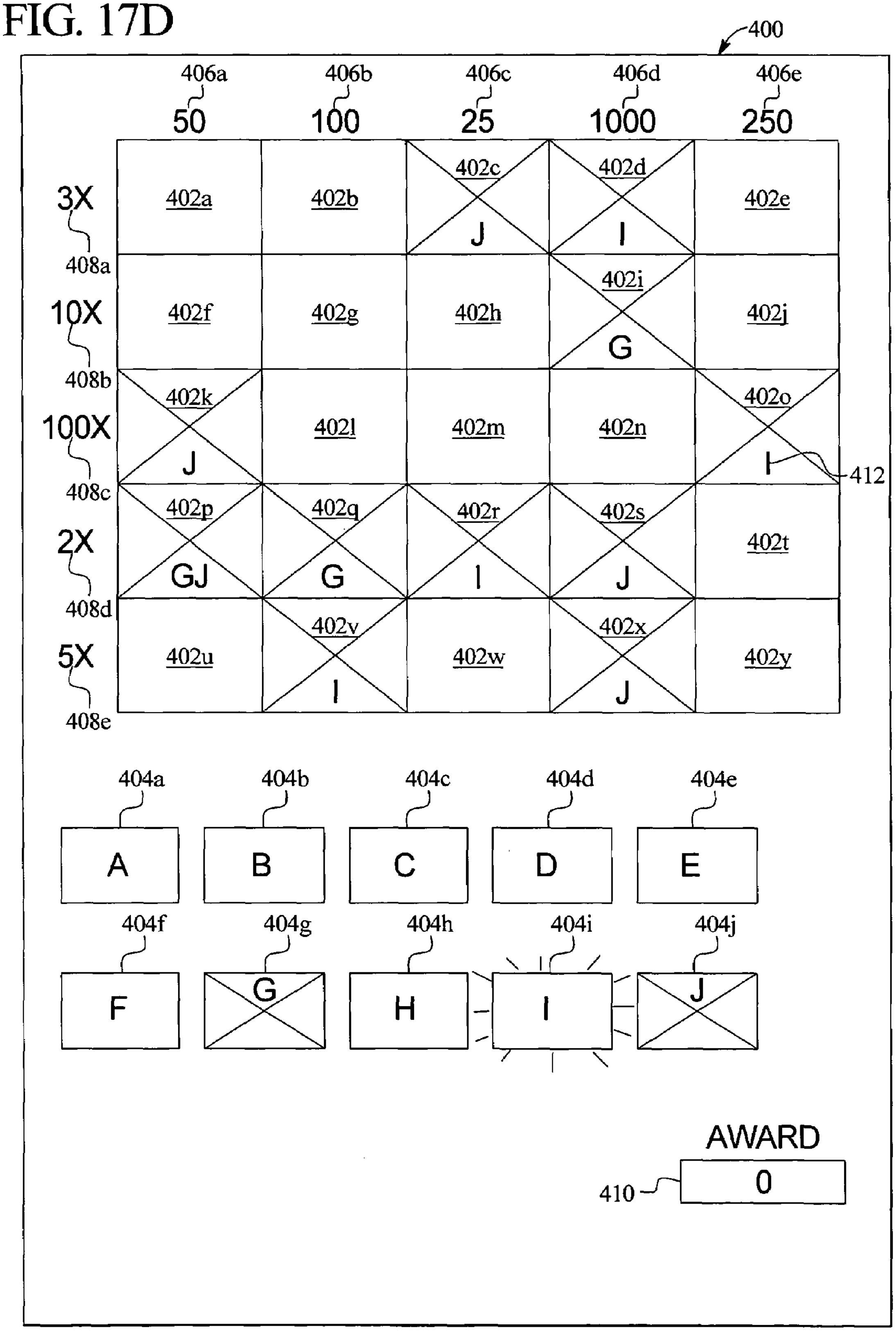

As illustrated in FIG. 17D, as each of the elements in a designated combination of elements are not marked, the player is enabled to pick another one of the plurality of selections to mark or flag at least one of the elements or symbols as described above. In this example, the player picked highlighted selection 404_i_ and the gaming device marked or flagged elements 402_d_, 402_o_, 402_r_ and 402_v_. After marking the elements in the element group associated with the player picked selection, the gaming device determines if a designated combination of elements (i.e., a complete row or complete column of elements) are marked or flagged.

Figure 17E:
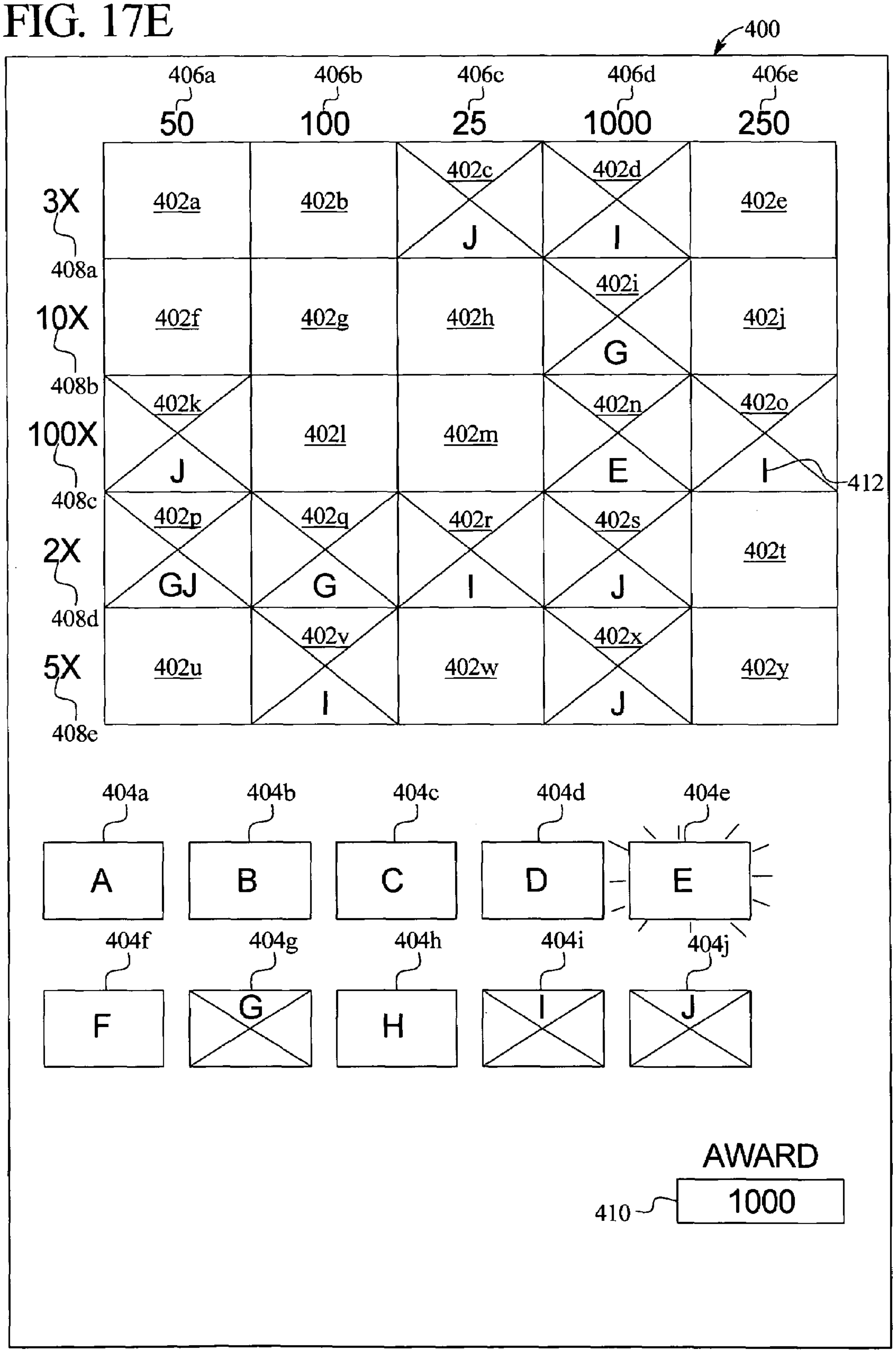

As illustrated in FIG. 17E, as each of the elements in a designated combination of elements are not marked, the player is enabled to pick another one of the plurality of selections to mark or flag at least one of the elements or symbols as described above. In this example, the player picked highlighted selection 404_e_ and the gaming device marked or flagged element 402_n_. After marking the elements in the element group associated with the player picked selection, the gaming device determines if a designated combination or pattern of elements (i.e., a complete row or complete column of elements) are marked or flagged.

As seen in FIG. 17E, as each of the elements in a designated combination of elements are flagged or marked, the gaming device provides the player any award associated with that designated combination of elements and ends the game. In this example, each of the elements 402_d_, 402_i_, 402_n_, 402_s_ and 402_x_ in the fourth column are flagged or marked and the gaming device provides the player the award value of one-thousand 406_d_ associated with that designated combination of elements. Appropriate messages such as "GAME OVER" and "YOUR AWARD IS 1000" may be provided to the player visually, or through suitable audio or audiovisual displays. It should be appreciated that in one embodiment, if more than one designated combination of elements or pattern of elements are simultaneously completed (i.e., each element of the designated combination is flagged) the gaming device is operable to provide the player the award associated with each completed combination of elements. In another embodiment, if more than one designated combination of elements are simultaneously completed (i.e., each element of the designated combination is flagged) the gaming device is operable to provide the player the award associated with one of the completed combination of elements.

Figure 17F:
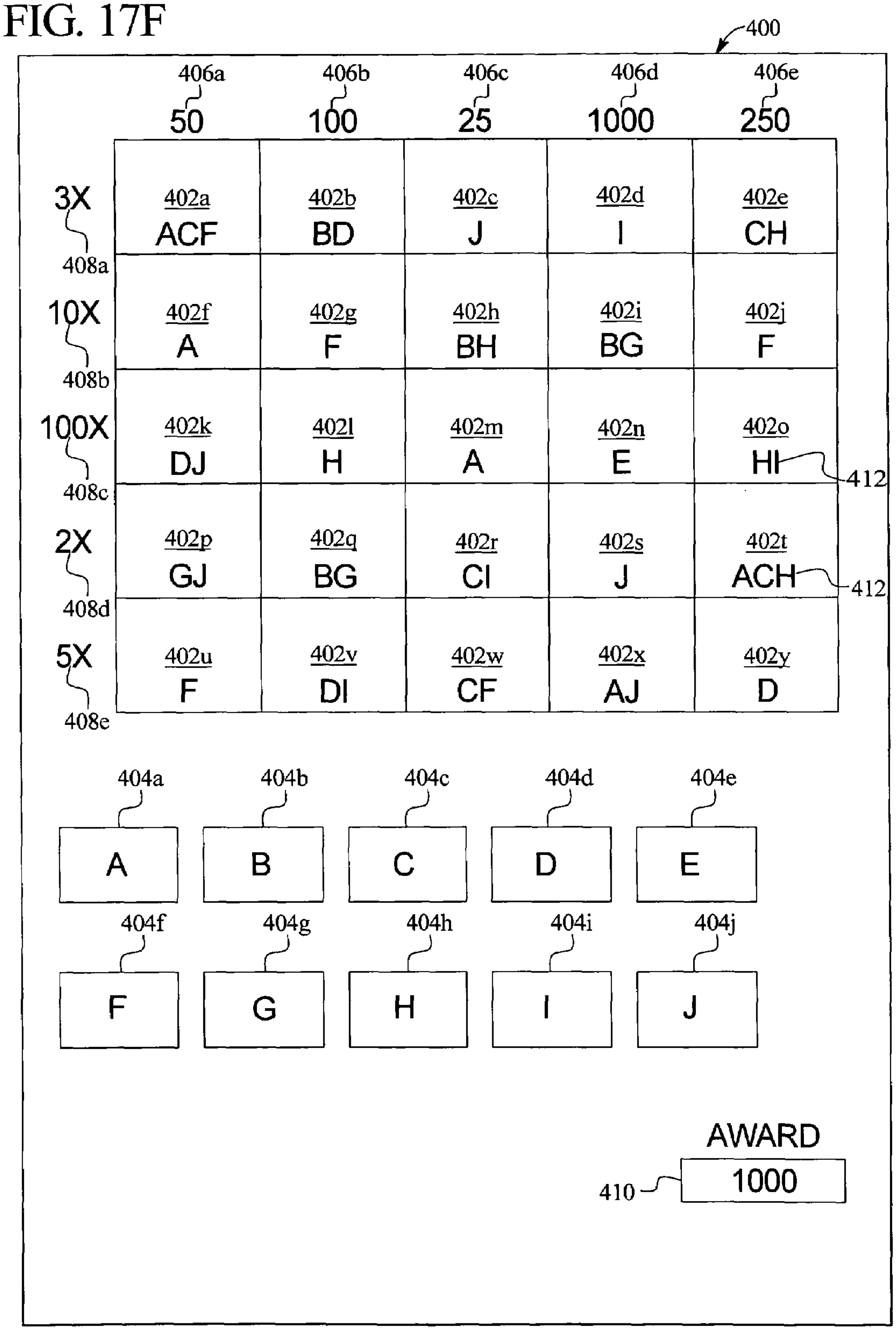

As illustrated in FIG. 17F, in one embodiment, after providing the player any award associated with a flagged designated combination of elements, the gaming device displays to the player, via the element group indicator for each element, which elements or symbols are in which element groups or sets. It should be appreciated that this embodiment provides increases excitement for the player because the player is enabled to view what award associated with what designated combination they could have obtained if they had picked different selections during game play.

Figure 18A:
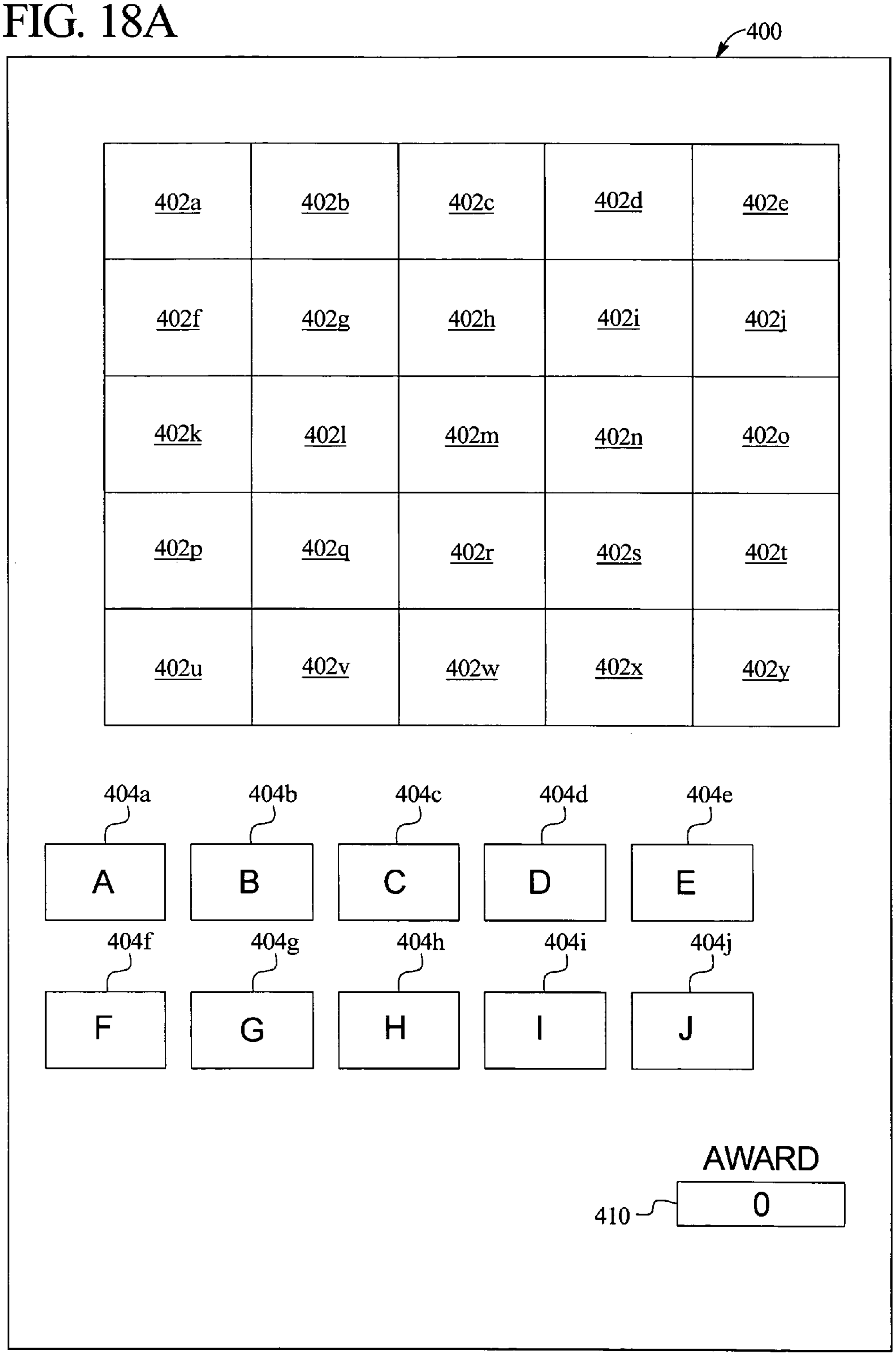
FIGS. 18A, 18B, 18C, 18D, 18E and 18F are front elevational views of another alternative embodiment of the present invention illustrating an award provided based on the flagged elements in a designated combination of flagged elements

Referring to FIG. 18A, in another embodiment of the present invention, the gaming device provides a plurality of elements or symbols 402_a_ to 402_y_ sorted into different element groups or sets and a plurality of selections 404_a_ to 404_j_ associated with the different element groups or sets as described above. However, in this embodiment, rather than associating an award with each different designated combination of elements, a plurality of awards are associated with a plurality of the elements as described more below.

In one embodiment, at least one of the elements is associated with at least one award. In another embodiment, a plurality of elements are each associated with at least one award. In another embodiment, each of the elements are each associated with at least one award. In one embodiment, a plurality of the awards associated with the elements are different. In another embodiment, each of the awards are different. In another embodiment, a plurality of the awards are the same. In another embodiment, each of the awards are the same.

In one embodiment, each of the awards associated with the elements are the same type of award, such as each award is a value or each award is a multiplier. In another embodiment, a plurality of the awards are different types of awards, such as one award is a value and another award is a multiplier. In another embodiment, each of the awards are different types of awards.

Figure 18B:
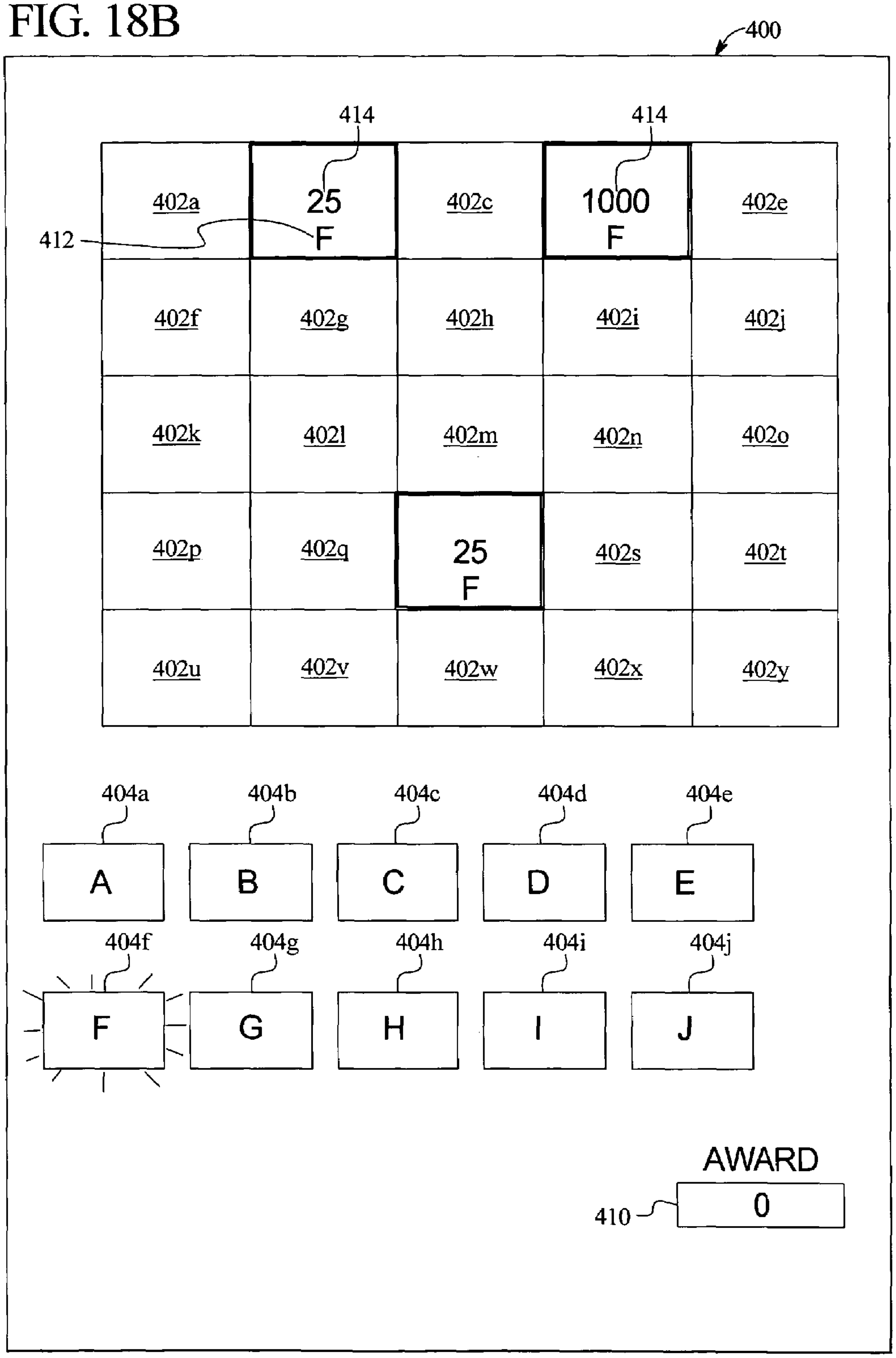

As illustrated in FIG. 18B, the player is enabled to select one of the plurality of selections. Once selected, each of the elements in the element group associated with the player picked selection are marked or flagged and any award associated with the marked elements are displayed to the player. In this example, the player picked highlighted selection 404_f_ and the gaming device marked or flagged elements 402_b_, 402_d_ and 402_r_. In addition to flagging each element in the element group associated with the player picked selection, the gaming device reveals the award, if any, associated with the marked or flagged elements. In this example, the gaming device revealed the award values 414 of twenty-five, one-thousand and twenty-five associated with marked elements 402*b*, 402*d* and 402*r*, respectively. As described above, for each marked element, an element group indicator 412 is adapted to indicate the association between the marked element and the element group associated with the player picked selection.

After marking the elements in the element group associated with the player picked selection, the gaming device determines if a designated element or combination of elements (i.e., a complete row or complete column of elements) are marked or flagged. If each of the elements in a designated combination of elements are not marked or flagged, this embodiment of the selection game continues and the gaming device enables the player to pick another one of the plurality of selections.

Figure 18C:
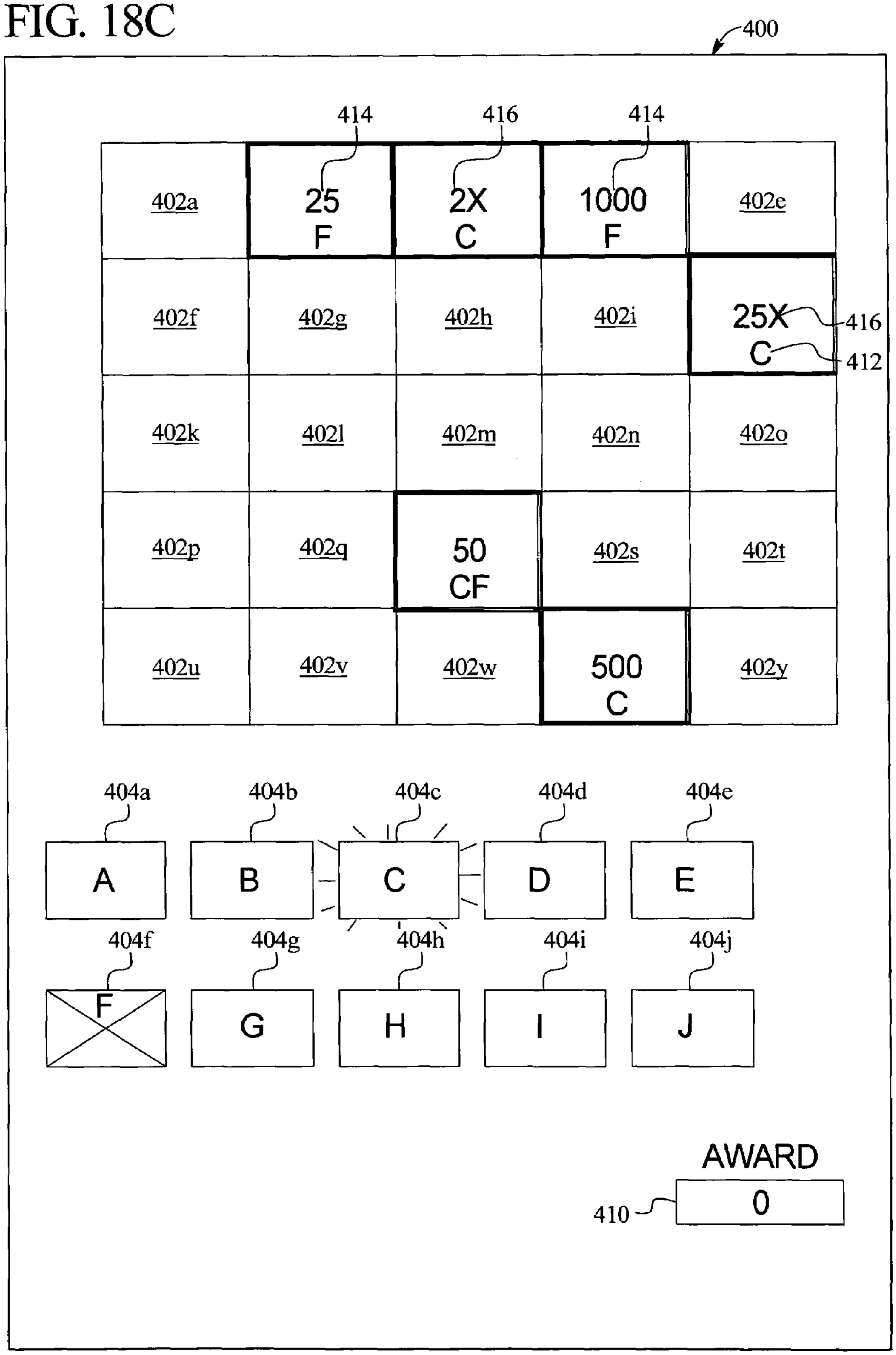

As illustrated in FIG. 18C, as each of the elements in a designated combination of elements are not marked, the player is enabled to pick another one of the plurality of selections to mark or flag at least one of the elements and the gaming device reveals any awards associated with the marked element(s) and determines if a designated element or combination of elements are marked or flagged as described above. It should be appreciated that, as noted above, previously picked selection 404*f* cannot be reselected by the player. In this example, the player picked highlighted selection 404*c* and the gaming device marked or flagged elements 402*c*, 402*j*, 402*r* and 402*x*. The gaming device revealed the award values 414 of fifty and five-hundred associated with marked elements 402*r* and 402*x*, respectively. Additionally, the gaming device also revealed the award multiplier of two and twenty-five 416 associated with marked elements 402*c* and 402*j*, respectively. It should be appreciated that in one embodiment, if an element is flagged more than once, the award revealed for that element is modified each time that element is flagged. That is, if two selections are picked and each selection is associated with an element group that includes the same element, then each time that element is flagged, the revealed award associated with that element is modified, such as increased or decreased. In this example, the first time a selection associated with an element group including element 402*r* was picked (i.e., the pick of selection 404*f*), element 402*r* revealed an award of twenty-five and the second time a selection associated with an element group including element 402*r* was picked (i.e., the pick of selection 404*c*) element 402*r* revealed an increased award of fifty.

In one embodiment, if the same element is marked or flagged more than one time, the award revealed with that marked element is modified one time. In another embodiment, if the same element is marked or flagged more than one time, the award revealed with that marked element is modified a plurality of times. In another embodiment, if the same element is marked or flagged more than one time, the award revealed with that marked element is modified each time that element is marked. In another embodiment, once an element is flagged, the award displayed as associated with that flagged element will remain constant regardless of how many times that element is subsequently flagged.

In one embodiment, if a previously flagged element is in an element group associated with a subsequently picked selection, the award associated with that element is modified by a predetermined amount. In another embodiment, if a previously flagged element is in an element group associated with a subsequently picked selection, the award associated with that element is modified by a randomly determined amount. In another embodiment, if a previously flagged element is in an element group associated with a subsequently picked selection, the award associated with that element is modified in a linear fashion. In another embodiment, if a previously flagged element is in an element group associated with a subsequently picked selection, the award associated with that element is modified in a non-linear fashion. In other embodiments, if a previously flagged element is in an element group associated with a subsequently picked selection, the award associated with that element is modified by an amount determined based on the player's wager in a primary game, determined from the occurrence of one or more symbols in a primary game or determined based on any other suitable method. In another embodiment, if a previously flagged element is in an element group associated with a subsequently picked selection, the award associated with that element is not modified.

Figure 18D:
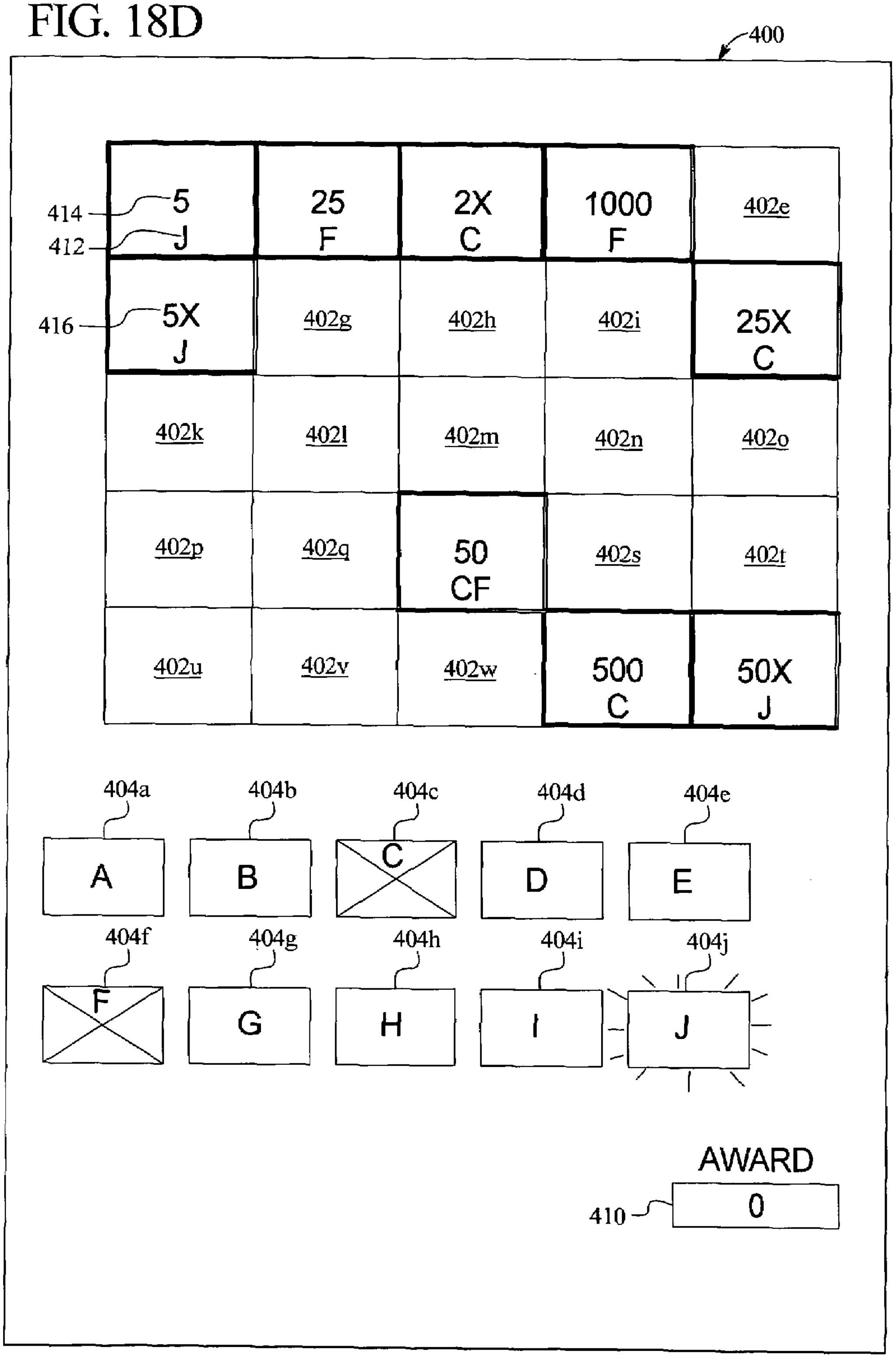

As illustrated in FIG. 18D, as each of the elements in a designated combination of elements are not marked, the player is enabled to pick another one of the plurality of selections to mark or flag at least one of the elements or symbols as described above. In this example, the player picked highlighted selection 404*j*, the gaming device marked or flagged elements 402*a*, 402*f* and 402*y* and the gaming device revealed the awards of a value of five, a multiplier of five and a multiplier of fifty associated with marked elements 402*a*, 402*f* and 402*y*, respectively. As described above, after marking the elements in the element group associated with the player picked selection, the gaming device determines if a designated combination of elements are marked or flagged.

Figure 18E:
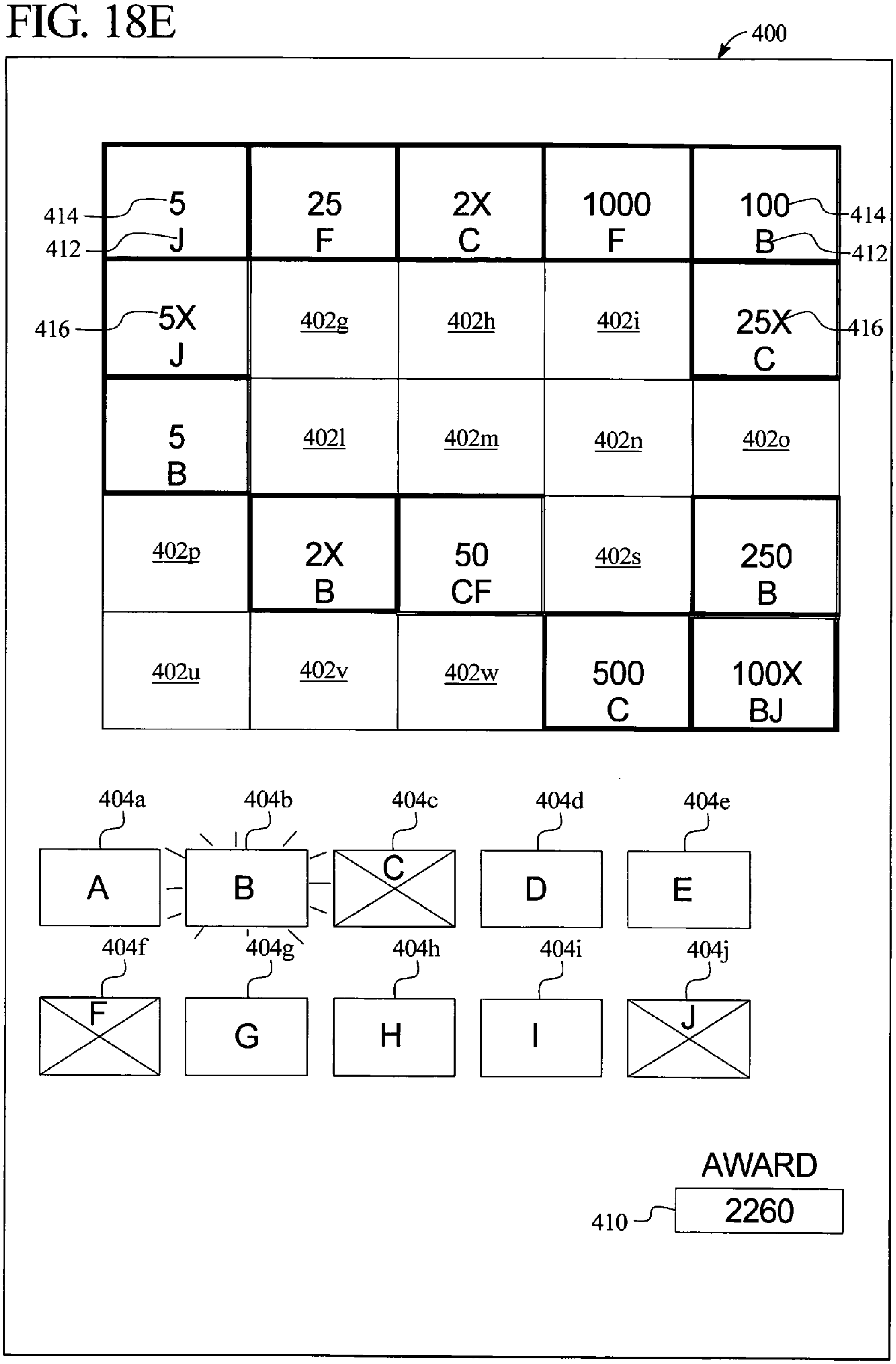

As illustrated in FIG. 18E, as each of the elements in a designated combination of elements are not marked, the player is enabled to pick another one of the plurality of selections to mark or flag at least one of the elements or symbols as described above. In this example, the player picked highlighted selection 404*b*, the gaming device marked or flagged elements 402*e*, 402*k*, 402*q*, 402*t* and 402*y* and the gaming device revealed the awards of a value of one-hundred, a value of five, a multiplier of two, a value of two-hundred-fifty and a multiplier of one-hundred associated with marked elements 402*e*, 402*k*, 402*q*, 402*t* and 402*y*, respectively. As described above, as element 402*y* is flagged more than once, the award revealed for that element is increased from a multiplier of fifty to a multiplier of one-hundred. After marking the elements in the element group associated with the player picked selection, the gaming device determines if a designated combination of elements are marked or flagged.

As seen in FIG. 18E, as each of the elements in a designated combination of elements are flagged or marked, the gaming device determines a total award based on any awards associated with the elements in the designated combination of elements. In this example, each of the elements 402*a*, 402*b*, 402*c*, 402*d* and 402*e* in the first row (i.e., the designated combination) are flagged or marked and the gaming device determines a total award of two-thousand-two-hundred-sixty or $(5+25+100+100)\times 2$ based on the awards associated with the elements in the designated combination of elements. The determined total award is displayed in a total award display 410 and the total award is provided to the player. It should be appreciated that any suitable mathematical operation or equation which utilizes one or more of the awards revealed with the flagged elements in the designated combination of elements may be employed in accordance with the present invention. Appropriate messages such as "GAME OVER" and "YOUR AWARD IS 2260" may be provided to the player visually, or through suitable audio or audiovisual displays.

Figure 18F:
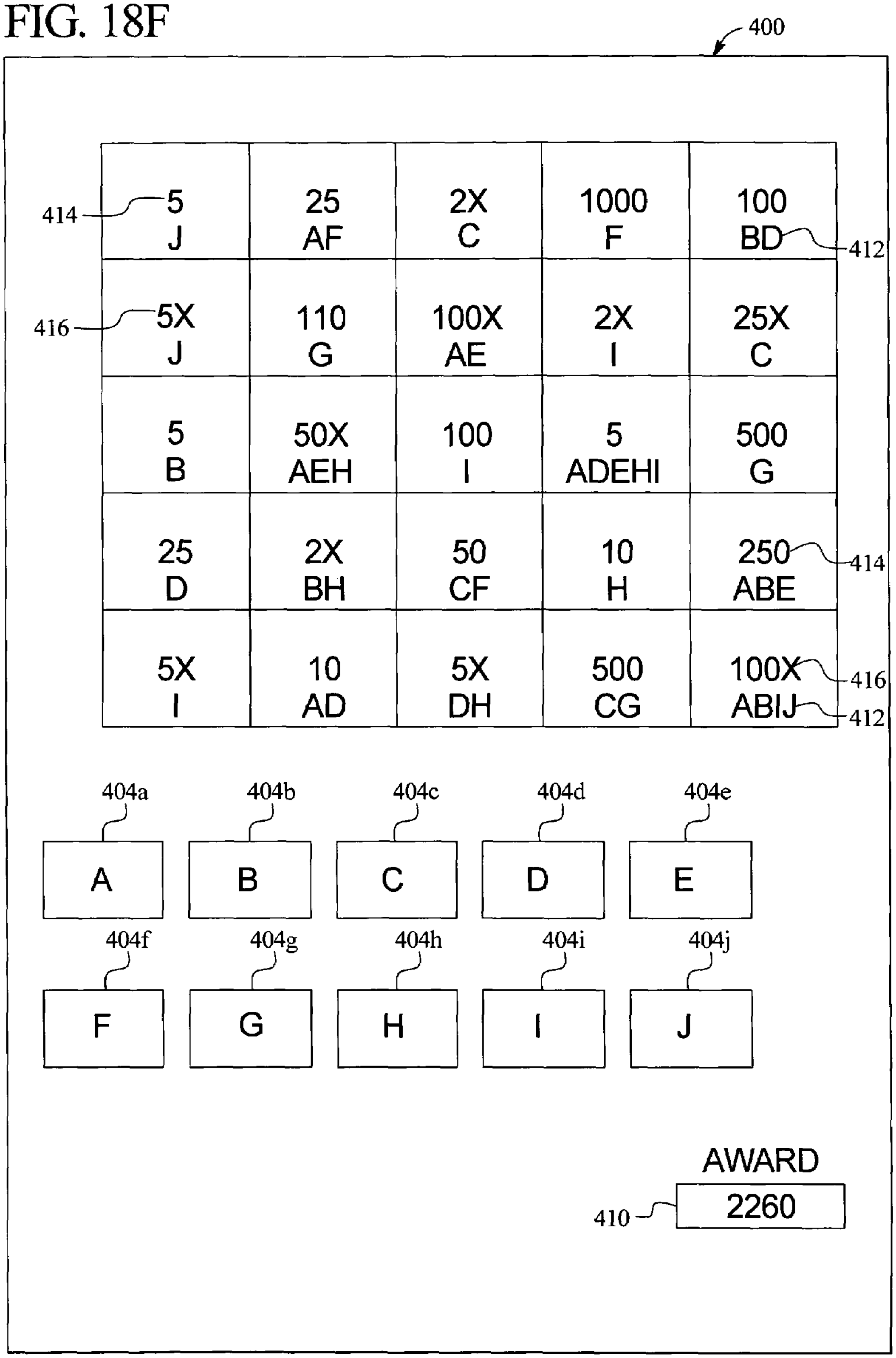

As illustrated in FIG. 18F, in one embodiment, after providing the player the total award, the gaming device displays to the player, any award associated with non-marked element as well as which elements or symbols are in which element groups or sets. It should be appreciated that this embodiment provides increases excitement for the player because the player is enabled to view what their total award could have been if they had picked different selections during game play. For example, if the player can determine the greater award they would have been provided if they had only picked selection 404*g* rather than 404*f*.

In another embodiment (not shown), one or more of the plurality of elements are associated with an additional stage, round or level of the selection game. In this embodiment, if an element which is associated with the additional stage, round or level is flagged (i.e., a selection is picked which is associated with the element group of that element), then upon conclusion of the current stage, round or level of the selection game, the gaming device provides at least one subsequent stage, round or level. In each subsequent stage, round or level, the gaming device provides the player a plurality of elements sorted into groups or sets and a plurality of selections that are each associated with one or more of the groups or sets as described above. In one embodiment, the provided elements for each subsequent stage are different than, such as associated with greater awards, the elements provided from a previous stage. In another embodiment, the provided elements for each stage are the same as the elements provided from a previous stage.

In another embodiment, at least one of the selections associated with a group or set of elements is operable to unflag or unmark any previously flagged elements which are in that group or set of elements. That is, at least one of the selections, when picked, is operable to remove the marking or flag that has been associated with any elements which were previously flagged and in the group of elements associated with the subsequently picked selection. For example, with reference to FIG. 17C, if selection 404*j* is associated with a unmarking or unflagging feature, then when selection 404*j* is picked by the player, element 402*p* which is in the element group or set associated with selection 404*j* (and which was previously flagged from the previous pick of selection 402*g*) will be unmarked or unflagged.

In another embodiment, the player is provided a number of picks of the selections. In this embodiment, if the player has no picks of the selections remaining and a designated combination of elements is not marked, then the game ends and the player is provided no award, a consolation award or any other suitable award. In different embodiments, the number of picks of the selections provided to the player is predetermined, randomly determined, determined based on the player's wager in a primary game, determined from the occurrence of one or more symbols in a primary game or determined based on any other suitable method.

The present invention is not limited to a square or rectangular-shaped grid as detailed above. While the present invention is discussed and illustrated primarily with respect to a two dimensional grid, it should be appreciated that any suitable arrangement of element groups, in two dimensions or three dimensions may be employed in accordance with the present invention. A variety of different matrix shapes or scattered arrangements may be utilized to facilitate and enhance the enjoyment and entertainment objectives of the present invention.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:
at least one input device;
at least one display device;
at least one processor; and
at least one memory device storing a plurality of instructions, which when executed by the at least one processor, cause the at least one processor to operate with the at least one input device and the at least one display device to:
provide a game;
provide a plurality of elements in said game;
provide a plurality of different element groups in said game, wherein each of said element groups includes at least one of said elements, at least one of said element groups includes a plurality of said elements and each of said plurality of different element groups is associated with one of a plurality of positions;
provide a plurality of selections in said game, wherein each of said selections is associated with one of said different element groups and at least one of said selections is associated with a plurality of said different element groups and wherein said plurality of selections are displayed separately from said plurality of positions;
provide at least one designated pattern of said plurality of positions, said designated pattern of positions including at least two of said positions; and
control a play of said game by:
(a) enabling a player to pick one of said selections, wherein any element group or element groups associated with the selection are not revealed to the player prior to the player picking said selection;
(b) flagging each of said respective positions of said element group or element groups associated with said picked selection;
(c) determining if all of the positions in one of said designated patterns of positions has been flagged;
(d) repeating (a) to (c) if all of the positions in one of said designated patterns of positions has not been flagged; and
(e) if all of the positions in one of said designated patterns of positions has been flagged, providing the player an award, wherein said award is based, at least in part, on said designated pattern of flagged positions.

2. The gaming device of claim 1, wherein a plurality of said element groups each include a plurality of said elements.

3. The gaming device of claim 1, wherein each of said element groups includes a plurality of said elements.

4. The gaming device of claim 1, wherein at least one of said element groups includes each of said elements.

5. The gaming device of claim 1, wherein a plurality of said selections are each associated with a plurality of said different element groups.

6. The gaming device of claim 1, wherein each of said selections are associated with a plurality of said different element groups.

7. The gaming device of claim 1, wherein said award includes a value.

8. The gaming device of claim 1, wherein said award is based, at least in part, on a multiplier.

9. The gaming device of claim 1, which includes a plurality of different designated patterns of positions.

10. A gaming device comprising:

at least one input device;

at least one display device;

at least one processor; and at least one memory device storing a plurality of instructions, which when executed by the at least one processor, cause the at least one processor to operate with the at least one input device and the at least one display device to:

provide a game;

provide a plurality of awards in said game;

provide a plurality of elements in said game, wherein a plurality of said elements are associated with said plurality of awards;

provide a plurality of different element groups in said game, wherein each of said element groups includes at least one of said elements, at least one of said element groups includes a plurality of said elements and each of said plurality of different element groups is associated with one of a plurality of positions;

provide a plurality of selections in said game, wherein each of said selections is associated with one of said different element groups and at least one of said selections is associated with a plurality of said different element groups and wherein said plurality of selections are displayed separately from said plurality of positions;

provide at least one designated pattern of said plurality of positions, each designated pattern of positions including at least two of said positions; and control a play of said game by:

(a) enabling a player to pick one of said selections, wherein any element group or element groups associated with the selection are not revealed to the player prior to the player picking said selection;

(b) flagging each of said respective positions of said element group or element groups associated with said picked selection;

(c) displaying any of said awards associated with said element or elements of the element groups associated with said respective flagged positions;

(d) determining if all of the positions in one of said designated patterns of positions has been flagged;

(e) repeating (a) to (d) if all of the positions in one of said designated patterns of positions has not been flagged; and (f) if all of the positions in one of said designated patterns of positions has been flagged, providing a player a total award, wherein said total award is based, at least in part, on any awards which are associated with said elements of the element groups associated with said designated pattern of flagged positions.

11. The gaming device of claim 10, wherein a plurality of said element groups each include a plurality of said elements.

12. The gaming device of claim 10, wherein each of said element groups includes a plurality of said elements.

13. The gaming device of claim 10, wherein at least one of said element groups includes each of said elements.

14. The gaming device of claim 10, wherein a plurality of said selections are each associated with a plurality of said different element groups.

15. The gaming device of claim 10, wherein each of said selections are associated with a plurality of said different element groups.

16. The gaming device of claim 10, wherein each of said elements is associated with one of said awards.

17. The gaming device of claim 10, wherein at least one of said awards is based, at least in part, on a multiplier.

18. The gaming device of claim 10, wherein at least one of said awards includes a value.

19. The gaming device of claim 10, which includes a plurality of different designated patterns of positions.

20. The gaming device of claim 10, wherein the processor is operable to control the play of said game by modifying the displayed award associated with at least one of said elements if a position associated with said element is flagged a plurality of times.

21. A method of operating a gaming device, said method comprising:

(a) enabling a player to pick one of a plurality of selections, each of said selections associated with one of a plurality of different element groups and at least one of said selections associated with a plurality of said different element groups, wherein each of said element groups includes at least one of a plurality of elements, at least one of said element groups includes a plurality of said elements and each of said plurality of different element groups is associated with one of a plurality of positions and wherein said plurality of selections are displayed separately from said plurality of positions;

(b) flagging each of said respective positions of said element group or element groups associated with said picked selection;

(c) determining if all of the positions in at least one of a plurality of designated patterns of positions has been flagged;

(d) repeating steps (a) to (c) if all of the elements in at least one of the designated patterns of positions has not been flagged; and (e) if all of the elements in at least one of the designated patterns of positions has been flagged, providing a player an award, wherein said award is based, at least in part, on said designated pattern of flagged positions.

22. The method of claim 21, wherein a plurality of said element groups each include a plurality of said elements.

23. The method of claim 21, wherein each of said element groups includes a plurality of said elements.

24. The method of claim 21, wherein at least one of said element groups includes each of said elements.

25. The method of claim 21, wherein a plurality of said selections are each associated with a plurality of said different element groups.

26. The method of claim 21, wherein each of said selections is associated with a plurality of said different element groups.

27. The method of claim 21, wherein said award includes a value.

28. The method of claim 21, wherein said award is based, at least in part, on a multiplier.

29. The method of claim 21, which is provided through a data network.

30. The method of claim 29, wherein the data network is an internet.

31. A method of operating a gaming device, said method comprising:

(a) causing one of a plurality of selections to be picked, each of said selections associated with one of a plurality of different element groups and at least one of said selections associated with a plurality of said different element groups, wherein each of said element groups includes at least one of a plurality elements, at least one of said element groups includes a plurality of said elements, a plurality of said elements are associated with a plurality of awards and each of said plurality of different element groups is associated with one of a plurality of positions and wherein said plurality of selections are displayed separately from said plurality of positions;

(b) flagging each of said respective positions of said element group or groups associated with said picked selection;

(c) displaying any of said awards associated with said flagged element or elements of the element groups associated with said respective flagged positions;

(d) determining if all of the positions in at least one of a plurality of designated patterns of positions has been flagged;

(e) repeating steps (a) to (d) if all of the positions in at least one of the designated patterns of positions has not been flagged; and (f) if all of the elements in at least one of the designated patterns of positions has been flagged, providing a player a total award, wherein said total award is based, at least in part, on any awards which are associated with said flagged positions in said designated pattern of flagged positions.

32. The method of claim 31, wherein a plurality of said element groups each include a plurality of said elements.

33. The method of claim 31, wherein each of said element groups includes a plurality of said elements.

34. The method of claim 31, wherein at least one of said element groups includes each of said elements.

35. The method of claim 31, wherein a plurality of said selections are each associated with a plurality of said different element groups.

36. The method of claim 31, wherein each of said selections is associated with a plurality of said different element groups.

37. The method of claim 31, wherein each of said elements is associated with one of said awards.

38. The method of claim 31, wherein at least one of said awards is based, at least in part, on a multiplier.

39. The method of claim 31, wherein at least one of said awards includes a value.

40. The method of claim 31, wherein if one of said elements is flagged a plurality of times, the award associated with that element increases at least once.

41. The method of claim 31, which is provided through a data network.

42. The method of claim 41, wherein the data network is an internet.

* * * * *